US012655641B2

(12) United States Patent
    Boucké

(10) Patent No.: US 12,655,641 B2
(45) Date of Patent: Jun. 16, 2026

(54) DECORATIVE PANEL AND METHOD OF PRODUCING SUCH A PANEL

(71) Applicant: i4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 13 days.

(21) Appl. No.: 18/724,647

(22) PCT Filed: Dec. 28, 2022

(86) PCT No.: PCT/EP2022/087962
    § 371 (c)(1),
    (2) Date: Jun. 27, 2024

(87) PCT Pub. No.: WO2023/126444
    PCT Pub. Date: Jul. 6, 2023

(65) Prior Publication Data
    US 2025/0122730 A1     Apr. 17, 2025

(30) Foreign Application Priority Data

Dec. 28, 2021    (NL) ...................................... 2030317
    Jan. 28, 2022    (NL) ...................................... 2030775

(51) Int. Cl.
    B32B 3/06          (2006.01)
    B32B 3/30          (2006.01)
    (Continued)
(52) U.S. Cl.
    CPC .......... E04F 15/02038 (2013.01); B32B 3/06 (2013.01); B32B 3/30 (2013.01); B32B 27/304 (2013.01); B32B 27/40 (2013.01); E04F

13/0866 (2013.01); E04F 13/0894 (2013.01); E04F 15/107 (2013.01); B29C 48/0011 (2019.02); B29C 48/0022 (2019.02); B29K 2027/06 (2013.01); B29K 2075/00 (2013.01); B29L 2031/732 (2013.01); B29L 2031/776 (2013.01); B32B 2471/00 (2013.01);
(Continued)

(58) Field of Classification Search
    CPC .......... B32B 3/06; B32B 3/30; B32B 2471/00
    See application file for complete search history.

(56) References Cited

U.S. PATENT DOCUMENTS 8,544,232 B2 * 10/2013 Wybo ............... B29C 66/12423
                                                    52/588.1
    2017/0114549 A9    4/2017 Pervan
    (Continued)

FOREIGN PATENT DOCUMENTS

EP          3105392 B1    4/2017
    WO      2021180882 A1    9/2021

*Primary Examiner* — Elizabeth E Mulvaney
(74) *Attorney, Agent, or Firm* — The Webb Law Firm

(57)                    ABSTRACT
The invention relates to a decorative panel, in particular a floor panel, ceiling panel or wall panel. The invention also relates to a decorative covering, in particular a decorative floor covering, decorative ceiling covering, or decorative wall covering, comprising a plurality of mutually coupled decorative panels according to the invention. The invention further relates to a core for use in a panel according to the invention. The invention additionally relates to a method of producing a decorative panel, in particular a decorative panel according to the invention.

21 Claims, 13 Drawing Sheets

(51) Int. Cl.

| | |
|---|---|
| B32B 27/30 | (2006.01) |
| B32B 27/40 | (2006.01) |
| E04F 13/08 | (2006.01) |
| E04F 15/02 | (2006.01) |
| E04F 15/10 | (2006.01) |
| B29C 48/00 | (2019.01) |
| B29K 27/06 | (2006.01) |
| B29K 75/00 | (2006.01) |
| B29L 31/00 | (2006.01) |
| E04F 15/18 | (2006.01) |

(52) U.S. Cl.
CPC ......... *B32B 2607/00* (2013.01); *E04F 15/181* (2013.01); *E04F 2201/023* (2013.01); *E04F 2201/042* (2013.01); *E04F 2201/043* (2013.01)

(56) References Cited

U.S. PATENT DOCUMENTS

| | | | |
|---|---|---|---|
| 2020/0282589 A1 | 9/2020 | Josefsson et al. | |
| 2022/0120096 A1* | 4/2022 | Schacht | C04B 28/105 |
| 2022/0259869 A1* | 8/2022 | Boucké | B29C 48/0022 |
| 2024/0093507 A1* | 3/2024 | Pervan | E04F 15/105 |

* cited by examiner 601
612     613
611
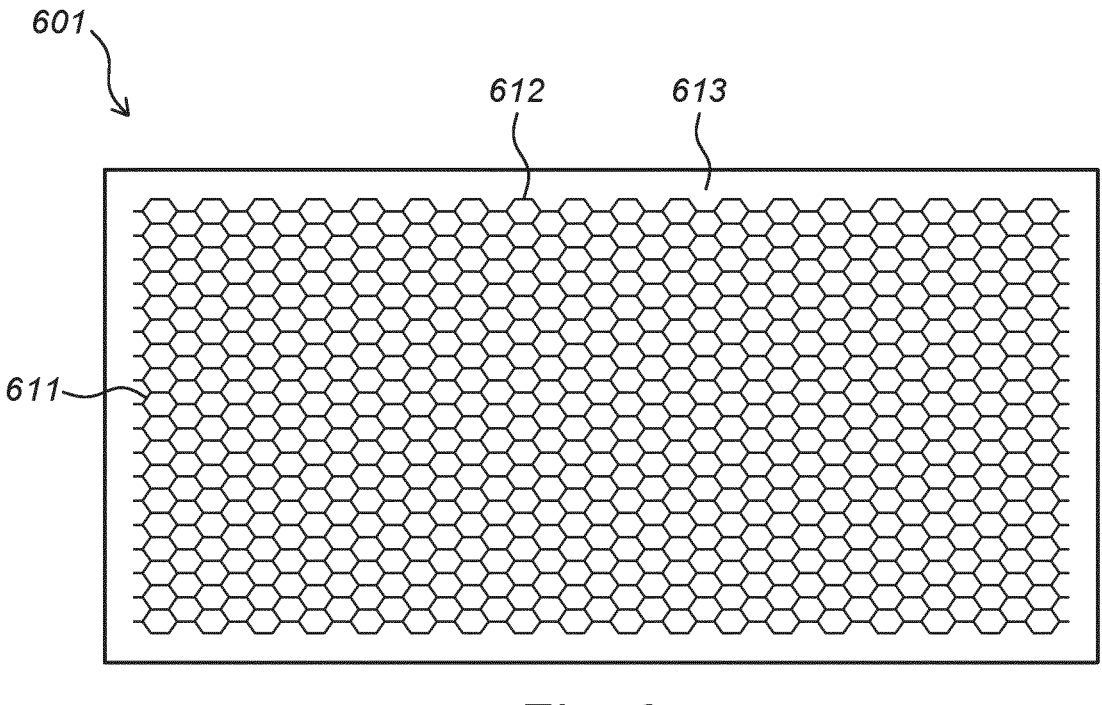
*Fig. 6a*
602
612,613     650
607
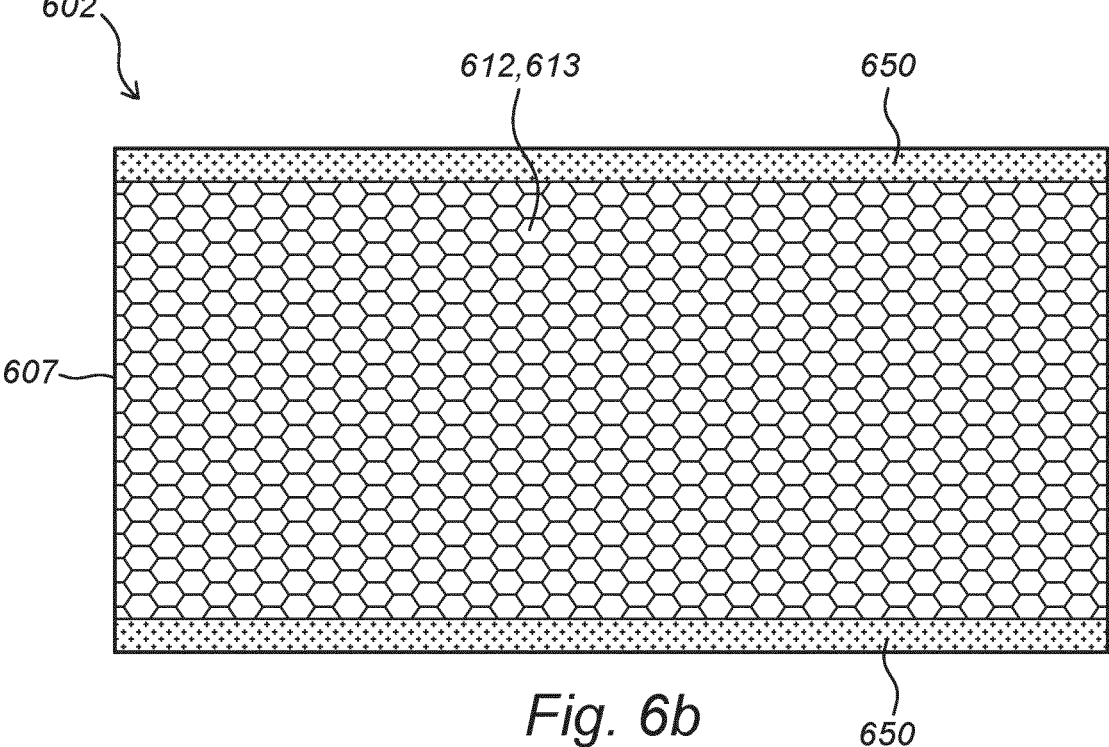
*Fig. 6b*     650

DECORATIVE PANEL AND METHOD OF PRODUCING SUCH A PANEL

CROSS-REFERENCE TO RELATED APPLICATIONS

This application is the United States national phase of International Patent Application No. PCT/EP2022/087962, filed Dec. 28, 2022, and claims priority to The Netherlands Patent Application Nos. 2030317, filed Dec. 28, 2021, and 2030775, filed Jan. 28, 2022, the disclosures of which are hereby incorporated by reference in their entireties.

BACKGROUND OF THE INVENTION

Field of the Invention

The invention relates to a decorative panel, in particular a floor panel, ceiling panel or wall panel. The invention also relates to a decorative covering, in particular a decorative floor covering, decorative ceiling covering, or decorative wall covering, comprising a plurality of mutually coupled decorative panels according to the invention. The invention further relates to a core for use in a panel according to the invention. The invention additionally relates to a method of producing a decorative panel, in particular a decorative panel according to the invention. The invention also relates to a profiled calendering roll for use in said method according to the invention.

Description of Related Art

Decorative coverings, in particular floor coverings, are more often formed by a plurality of interconnected panels, wherein each panel having an extruded core of thermoplastic based core material, as these coverings typically have relatively good waterproof properties. In consideration of the increasingly stricter ecological requirements or motivations for saving materials, weight and energy, amongst others, the need arises for thinner panels, yet still with sufficient strength and shape retention and with sufficiently strong coupling or connecting profiles at their edges of the panels or tiles with adjacent panels or tiles.

SUMMARY OF THE INVENTION

It is a first object of the present invention to provide an improved relatively light-weight interconnectable decorative panel.

It is a second object of the present invention to provide an alternative light-weight interconnectable decorative panel.

It is a third object of the present invention to provide a relatively light-weight interconnectable decorative panel having a calendered core.

It is a fourth object of the present invention to provide a relatively light-weight interconnectable decorative panel which can be manufactured in a relatively efficient manner.

At least one of the aforementioned objects is achieved by the decorative panel, in particular a floor panel, ceiling panel or wall panel, according to the invention, comprising:
- a core, preferably a calendered core, more preferably an extruded and calendered core, composed of at least one core layer and provided with an upper side and a lower side,
- a decorative top structure, either directly or indirectly, affixed on said upper side of the core, preferably by means of calendering, a first panel edge preferably comprising a first coupling profile, and a second panel edge preferably comprising a second coupling profile being designed to engage interlockingly with said first coupling profile of an adjacent panel, both in horizontal direction and in vertical direction.

Preferably, the upper side and/or the lower side of at least one core layer and/or the core is provided with at least one impressed pattern which preferably comprises one or more impressed core grooves. The impressed pattern(s) and/or impressed core grooves are preferably (i) realised by means of extrusion, and/or (ii) realised and/or preserved by calendering, including rolling, stamping, or pressing, and/or (iii) by core material removal, preferably by means of etching, and/or by means of milling or scraping. The impressed pattern may be formed by a plurality of impressed core grooves. The impressed pattern may also be formed within or by an impressed core groove.

The decorative panel according to the invention has several advantages. A first advantage is that the weight of the panel per $m^2$ of top surface is relatively low, leading to a light-weight panel, which is beneficiary from an economic, environmental and logistic point of view. The relatively low areal weight of the panel is realized by applying a plurality (two or more) of core grooves, and/or an alternative impressed pattern, in the upper side and/or lower side of the core, which reduces the amount of material used in the core and therefore in the panel as such. A further advantage is that the core grooves and/or alternative pattern are impressed into the core, preferably during and by means of extrusion and/or during and by means of calendering. During calendering the core material is typically flattened and smoothened. In a preferred embodiment, the core grooves are realized by means of extrusion, after which the still softened core material is guided through a calendering device, in between two or more calendering rolls with at least one profiled calendering roll, to preserve the core grooves created during extrusion. To this end, during calendering the profiled calendering roll(s) is/are preferably facing towards the core surface(s) which is(/are) provided with the core grooves, wherein the profile roll is provided with a profiled outer surface which is preferably substantially complementary to the grooved surface of the core. Hence, during calendering the (extruded) core grooves may be preserved (maintained). It is also imaginable that the core grooves are deformed during the calendering to give the core grooves their final shape. Typically, this deformation is less than the deformation realized during extrusion. Preferably, in the calendaring device used, each set of adjacent rollers comprises at least one profile roll and at least one unprofiled roll, such that profile(d) rolls and unprofiled rolls are alternately oriented. The calendering deformation (i.e. the deformation realized by means of calendering) is preferably focused to finetuning of the final shape of the core grooves, such as the shape of the edges of the core grooves, while the extrusion deformation (i.e. the deformation realized by means of extrusion) is more focussed to the formation of the basis shape of the core grooves. It is further imaginable that the core grooves are entirely formed during calendering (e.g. in case a preceding extrusion process is not configured to realised the core grooves). During the impression of the core grooves and/or alternative pattern, the core is typically just discharged from an extruder, and therefore still in a softened and/or molten state, which should be understood as viscous or paste-like. It is also imaginable to bring the core material in a softened state without extruder or without using extrusion. During production of the core, a hot mass of thermoplastic comprising core material is led through a calendering device with a plurality of, typically heated, facing, but distant calendering rolls to form a (continuous sheet). Since the core material is softened, and even molten, the core can be deformed relatively easily, without having the risk to damage, such as breaking or cracking, the core. Moreover, impressing the grooves into the core when the core is still in a softened state prevents the tools used for impressing the core from excessive wear. As mentioned above, a suitable tool in this situation is a profiled calendering roll, the surface of which is complementary (i.e. a negative) of the profiled core surface (patterned core surface) to be formed on the upper side and/or lower side of the core. In the softened state of the temperature of the core is typically above room temperature. Since thermoplastic material, such as polyvinylchloride (PVC) or thermoplastic polyurethane (TPU), is typically present as constituent of the core, the temperature of the softened core during impression of the core, preferably during calendering, is preferably near or above the melt temperature of the thermoplastic material. Preferably, during the calendering process, also at least a part of the decorative structure, or even the entire decorative structure, is laminated with and affixed to the core, typically after the core has been provided with the impressed core grooves and/or alternative pattern to prevent damaging of the decorative structure.

By using a calendering device, also referred to as a calender, predefined core grooves and/or an alternative surface pattern can be formed and/or preserved in-line during the production process, which is relatively efficient, practical, and economical from an energetic and financial point of view. Moreover, in this way the impression of the grooves or alternative pattern does not have to be realized in away from the calendering device in an entirely separate downstream operation, which would involve re-heating of the core to a suitable temperature, separate equipment with heaters is not needed, which is favourable from an energy point of view. Moreover, this avoids the acquisition of extra heat history which could affect the quality of the core, and hence of the decorative panel as such.

The calender preferably comprises a plurality of rolls (rollers), wherein at least one profiled roll is used with a pattern complementary to the core groove pattern to be realized. Preferably, one of the rolls is formed by a backing roll, which is usually of substantially larger diameter, and which is preferably covered with a synthetic rubber to provide the requisite degree of resilience. This backing roll could be cooled internally and/or externally to prevent distortion and possibly deterioration of the rubber, and to maintain a reasonably constant level of resilience. Preferably, the profiled roll is cooler than other calender rolls to allow a more precise definition of the groove pattern applied in the core. This latter also applies in case the nip pressure (i.e. the pressure exerted by adjacent rolls to the core material) is relatively high, although the optimum pressure will vary with the core formulation, as well as its temperature and rate of passage through the unit. One (either one) of the profiled roll and adjacent backing roll is positively driven. The drive may be independent of those of the other rolls of the calender, but is preferably suitably synchronised to avoid (over) stretching the core. Uncontrolled stretching could namely lead to the introduction of strain into the core, which impairs the dimensional stability of the core during subsequent (heat) processing (e.g. during lamination) and during use.

In the calendering process, the core and optionally further layers, such as the decorative top structure, is/are moved forward by friction against roll surfaces in its passage through consecutive nips of the calendering rolls. Upstream of the calendering device at least one extruder, which may be a co-extruder, could be installed, which extruder creates a continuous slab, preferably provided with core grooves and/or an alternative pattern, which is subsequently guided and pressed in the calendering device. Downstream of the calendering device, typically a finishing line is installed, configured to cut or saw the continuous sheet in panels, and to profile at least two panels edge of each panel to form the first coupling profile and second coupling profile.

In case the core composition would e.g. comprise PVC, the PVC based composition fed to the calendering device is normally already gelled and molten, the calendering device's primary function is to form it into a uniform sheet of the required thickness. In practice, typically care should be taken to the PVC composition's adhesion to the roll surfaces, and the ratio of the roll speeds at a nip, which is often referred to as the friction ratio. Unless the PVC composition is grossly over-lubricated, a hot PVC calendering compound will adhere to a hot roll surface, wherein the adhesion is stronger to a matt than to a smooth, polished surface. This adhesive property usually increases with the roll temperature, although some PVC compositions may be formulated to minimise or even reverse this effect by suitable selection of the lubricant system. Hence, the core preferably comprises at least one lubricant.

In case the impressed pattern(s) of the core is at least partially realized by means of etching, typically core material will be removed from the core, as a result of which this type of impressed pattern(s) may also be referred to as etched pattern(s) and/or engraved pattern(s). The etching is preferably realized by means of lasering, and/or by means of ultrasonic etching, and/or by means of plasma treatment. In case of plasma treatment, this treatment is usually performed in oxygen-containing gases, which causes oxidation, and therefore etching (material removal) of a polymer material of the core (layer). Examples of etching rates of different thermoplastic polymers which may be used in one or more core layers are presented in the table below, wherein plasma was created in an electrodeless, radiofrequency discharge at a power of 200 W and a frequency of 27.120 MHZ, wherein the oxygen pressure was fixed at approximately 75 Pa.

| Polymer | Thickness (mm) | Density (g/cm3) | Melting T/° C. | Max. working T/° C. | Time when melting starts | Etching rate at 20 s of treatment |
|---|---|---|---|---|---|---|
| PVC | 0.50 | 1.40 | 100 | 50-75 | ~30 s | 178 nm/s |
| LDPE | 1.00 | 0.92 | 110 | 50-90 | ~100 s | 31 nm/s |
| HDPE | 1.00 | 0.95 | 130 | 55-120 | ~100 s | 34 nm/s |
| PMMA | 0.50 | 1.19 | 160 | 50-90 | — | 6 nm/s |
| PS | 0.125 | 1.05 | 240 | 50-95 | ~40 s | 13 nm/s |
| PET | 0.25 | 1.3-1.6 | 260 | 115-170 | ~100 s | 35 nm/s |

Referring to the above table, one can see that, out of the selected polymers, PVC has the largest etching rate. In case a core layer comprises PVC and is subjected to an etching treatment of, for example, 5 seconds, etched cavities can be created with a depth of approximately 0.9 mm.

The core groove may be elongated, but may also be formed by an alternatively shaped cavity or recess. In case elongated core grooves are applied, these core grooves may be linear, non-linear, curvilinear, and/or angular. Instead of impressed core grooves or in addition to impressed core grooves, it is imaginable to provide the upper side of the core and/or lower side of the core with at least one alternative impressed pattern. This alternative impressed pattern is a three dimensional (3D) pattern, which typically comprises impressed portions and untouched (unimpressed) portions. The impressed portions may be composed of intensively impressed portions and less impressed portions. This may, for example, result in a spike pattern, a pyramid pattern, a honeycomb pattern, a stripe pattern, a diamond pattern, a rib-shaped pattern, a pattern based upon frustoconical shapes, a dotted pattern, a stochastic pattern, a non-stochastic pattern. Each cavity (groove) of the impressed pattern may have a curved, in particular circular or elliptical cross-section, or a polygonal cross-section, such as a triangular, square, pentagonal, hexagonal, rhombic, quadrilateral, and/or octagonal cross-section. Preferably, at least a number of cavities (grooves) of the core or at least one core layer have a simple polygonal cross-section, in particular a convex polygonal cross-section. The cavities or grooves as such may be prism shaped, such as a cylindrically shaped, tetrahedron prism shaped, triangular prism shaped, cube shaped, hexagonal prism shaped, or may have a more complex shape, such as e.g. both partially prism shaped and partially polyhedron shaped, such as pyramid shaped, in particular triangular, square, pentagonal, hexagonal, or octagonal pyramid shaped. Preferably, the cavities (or grooves) comply with a Weaire-Phelan structure. This geometric structure is a three-dimensional structure representing an idealised foam of equal-sized cavities with two different shapes. This structure can be a monolayer structure with cavities (2D structure) or a multilayer structure with cavities (3D structure). Alternatively shaped cavities or grooves are also imaginable. The cavities or grooves may be arranged in an identical orientation and/or may have identical dimensions. However, it is also imaginable that a number of cavities (or grooves) have mutually different dimensions and/or shapes and/or orientations. For example, it is imaginable that the impressed pattern(s) is composed of a plurality of sub patterns, wherein the sub patterns may have a same cavity (or groove) layout, but wherein at least two sub patterns have different, e.g. tilted, orientations with respect to the panel and/or different cavity (or groove) depths. A non-limitative example of this latter embodiment is shown in FIG. 6d. The sub patterns (if applied) may also arranged such that a center portion of the core is provided with the deepest cavities (or grooves), while at least one peripheral portion of the core (i.e. at least one edge portion of the core) is provided with a less deep pattern. This allows coupling profiles to be located at the edge without (seriously) weakening these coupling profiles, while still having some kind of pattern and/or texture at the edge to dampen sound waves and/or to provide the panel with improved anti-slip properties at the rear side of the panel.

Preferably, a centre portion of said impressed pattern comprises impressed core grooves having a depth which exceeds a depth of impressed core grooves of at least one peripheral portion of the impressed pattern. This means that more shallow grooves (or cavities) are applied towards the panel edges, which makes the panel edges less vulnerable, in particular in case the panel edges are provided with coupling profiles. Preferably, said at least one peripheral portion of the impressed pattern defines a circumferential peripheral portion of the impressed pattern enclosing the centre portion of the impressed pattern. More preferably, the core comprises a centre portion and a peripheral portion enclosing said centre portion, wherein the panel edges and coupling profiles make part of said peripheral portion of the core, wherein the peripheral portion of the core encloses said at least one peripheral portion of the impressed pattern, and wherein said peripheral portion of the core is free or substantially free of core grooves. This results in the situation that the centre portion of the core comprises relatively deep grooves or cavities, and that a peripheral portion of the impressed pattern enclosing said centre portion comprises less deep grooves or cavities, and that an outer peripheral portion of the core is free or substantially free of grooves or cavities. It is imaginable that the depth of the impressed core grooves of the least one peripheral portion of the impressed pattern decreases towards an adjacent panel edge. This means that there will be a shallowing effect of the grooves or cavities towards the panel edges.

Preferably, at least one, more preferably each, core groove comprises at least one circumferential edge enclosing a groove bottom, wherein groove bottom has the shape of a pyramid, in particular a square pyramid (in case of a square circumferential edge) or a hexagonal pyramid (in case of a hexagonal circumferential edge). The deepest point of the groove bottom is located in the centre of the groove bottom. This embodiment leads to improved sound dampening properties. Preferably, at least one, preferably each, core groove comprises at least one circumferential edge enclosing a groove bottom, wherein the circumferential edge is tapered towards the groove bottom. Also this embodiment leads to improved sound dampening properties. This could e.g. lead to grooves (cavities) having a truncate pyramid shape, including a flat groove bottom. It is imaginable to combine both embodiments, for example by applying a tapered circumferential edge and a pyramid shaped groove bottom.

Preferably, the lower side of the core, in particular the lower side of a lowest core layer, is provided with an impressed pattern of polygonal cavities (in cross-section), such as square, rectangular, pentagonal, of hexagonal cavities (in cross-section), wherein the cavities are oriented side-by-side, and wherein the cavities are defined by one or more circumferential cavity walls. Each cavity wall preferably is a shared cavity wall spacing adjacent cavities. Preferably, the cavity walls together define a grid enclosing the cavities. Preferably, the width of the cavity walls is situated between 2 and 3.5 mm, more preferably between 2.5 and 3 mm. Preferably, the (smallest) cavity width of at least a number of cavities is situated between 5 and 20 mm, preferably between 7.5 and 15 mm, more preferably approximately 1 mm. This will lead to a serious reduction of the material needed to compose the core, while securing sufficient core stability, in particular core rigidity, during use. Moreover, this will typically improve the acoustic sound dampening properties of the core. These advantages can further be improved in case, as preferred, the cavity depth exceeds the smallest cavity width. Moreover, the grid like lower side of the core typically improves the anti-slip properties of the core, meaning that the core will be less inclined to move over an underfloor once installed in a floating manner, and during normal use.

The application of an impressed pattern leads to a profiled upper surface and/or lower surface of the core, which may improve the acoustic (sound dampening) properties of the core, and hence of the decorative panel as such. Alternatively, the impressed pattern defines a decorative pattern, which may e.g. define a signature of the decorative panel manufacturer and/or which may be selected by a customer or any other party. Preferably, in case the calendering device is used to pattern the core, the calendering device comprises at least two profiled calendering rollers with different profiles, and which can be used interchangeably during operation. In case another pattern would be desired, a mounted profiled roller could be unmounted from a support frame, and hence be replaced by another profiled roller which can be mounted to said support frame. In this manner, the design of the pattern to be applied can (easily) be adapted. Although the (outer surface of the) profiled roller(s) is/are typically substantially composed of metal, it is imaginable to substantially compose the (outer surface of the) profiled roller(s) of a polymer and/or a composite material.

In case impressed core grooves are applied in the upper side and/or lower side of the core, it is preferred that at least two opposing edges of each core groove are at least partially, preferably entirely curved, in particular convexedly curved and/or concavedly curved. Curved edges are less vulnerable for breakage and damaging compared to sharp edges, which makes the core, and hence the panel as such, more robust and more durable. Preferably, the core grooves are elongated, and wherein at least two opposing longitudinal edges of each groove are at least partially, preferably entirely, curved, in particular convexedly curved and/or concavedly curved. More preferably, the curved edges of each groove are substantially sigmoidally curved. A sigmoid curve is a S-shaped curve with one inflection point. This may further prevent the formation of vulnerable edges or spots at the transition zone(s) between the core surface and recessed, impressed portion(s) formed therein. Curved (circumferential) edges are also preferred in case an alternative impressed pattern is applied. In case the patterns would comprise protrusions, such as spikes, pyramids, dots, ribs, which are not configured to bear load, and which main function is to dampen sound, these protrusions could be provided with sharp edges (and also with curved edges). The curved edges are preferably defined by a curved counter-profile of a profiled calendering roll. However, the temperature of the core material and/or of the profiled calendering roll may also be such that the core material is allowed to flow (to some extent), which will contribute to the formation of curved edges.

Preferably, at least two core grooves extend in parallel directions. More preferably, the maximum core groove width of each core groove exceeds the distance in between adjacent grooves. This means that relatively wide core grooves are preferably applied, which leads to an improved saving of material and cost.

Each core groove preferably comprises at least one circumferential edge enclosing a groove bottom, wherein at least a part of the at least one circumferential edge is formed by stretched material, and wherein the at least a part of the groove bottom is formed by compressed material. With respect to the circumferential edge it is noted that the higher the stretch ratio, the higher the amount of induced crystallinity (a more ordered internal structure) after processing. This typically leads to an improved of mechanical properties, in particular the tensile strength, tensile modulus and rigidity. Also in the compressed material of the groove bottom an induced crystallinity can be observed with an increased rigidity compared to surrounding amorphous parts of the core. This is for example the situation wherein a thermoplastic is used as component of the core composition, such as PVC, TPU, PP, PET, etc. The thermoplastic material used in the core, or in the panel as such, can be virgin material, recycled material, or a combination of both.

The lower side and/or upper side of the core may have substantially the same surface texture as at least a part of each core groove, and preferably wherein that the lower side and/or upper side of the core and the core grooves have substantially the same surface texture. This is typically a substantially smooth surface texture. However, as said above, the groove may (also) comprise a textured, preferably patterned, surface.

In a preferred embodiment, the core groove depth (GD) of at least one core groove is less than 0.3 times a panel thickness (T), more preferably wherein the core groove depth (GD) of at least one core groove is less than 0.2 times the panel thickness. This leads to relatively shallow grooves, which allows the grooves with relatively large width to be applied. This facilitates the realization of the core grooves by means of extrusion and/or calendering.

It is imaginable that the core groove depth (GD) of at least one core groove varies along the core groove length. Preferably, each core groove is defined by two terminal portions (outer ends) enclosing a centre portion, and wherein the core groove depth (GD) of the centre portion at least one core groove varies along the core groove length. At least one groove wall of at least one core groove has a waved surface. The changing groove depth (GD) along the core groove may seriously improve the acoustic properties (sound dampening properties) of the panel as such.

In a preferred embodiment each core groove comprises at least one circumferential edge enclosing a groove bottom, wherein the groove bottom of at least one core groove is profiled, wherein more preferably the groove bottom is provided with a patterned profiled surface, in particular a spike patterned profiled surface and/or a pattern of frusto-conically shaped spikes. Other suitable pattern related examples have been described above already. The profiled, patterned groove bottom may contribute to the desired sound dampening properties of the core, and hence of the panel as such.

Preferably, one core groove, and preferably each core groove, extends to and connects different edges, in particular to opposing edges, of the panel. Preferably, the panel is oblong, wherein at least two core grooves extends in longitudinal direction of the panel and/or wherein at least two core grooves extends in transverse direction of the panel.

Preferably, the surface texture of the lower side and/or upper side of the core is such that another layer can be attached easily and durably to the core. This attachment of this at least one additional layer to the core can be realized e.g. by means of gluing, by means of welding, by means of printing, and/or by means of coating. Although both the lower side and the upper side of the core may be provided with core grooves, it is also imaginable, and typically preferable, that merely one side of the core is provided with core grooves, more preferably that merely the lower side of the core is provided with core grooves. The panel according to the invention may be rigid or may be flexible (resilient), or slightly flexible (semi-rigid). The panel according to the invention is configured to be coupled to one or more other (typically similar) panels in order to form a covering, in particular a floor covering, a wall covering, a ceiling covering, or a furniture covering. The panel according to the invention may be used as indoor (interior) panel and/or as outdoor (exterior) panel.

It is imaginable that each panel edge defines at least one vertical plane (VP) perpendicular to a horizontal plane (HP), which horizontal plane (HP) is parallel to the core, wherein the entire part of the core grooves is arranged inside the vertical planes (VP) respectively defined by at least two opposing panel edges, such the core grooves do not intersect any coupling profile of the first coupling profile and the second coupling profile. It is imaginable that the panel comprises a third panel edge comprising a third coupling profile, and a fourth panel edge comprising a fourth coupling profile being designed to engage interlockingly with said third coupling profile of an adjacent panel, both in horizontal direction and in vertical direction. Preferably, the entire part of the core grooves is arranged inside the vertical planes (VP) respectively defined by all panel edges, such the core grooves do not intersect any coupling profile of the first coupling profile, the second coupling profile the third coupling profile, and the fourth coupling profile. An important additional advantage of this embodiment of the decorative panel according to the invention is that the grooves are applied merely within a centre portion of (the lower side and/or upper side of) the core and not in the peripheral portion of (the lower side and/or upper side of) the core. The core grooves are therefore located at a distance from at least two coupling profiles, and preferably at least four coupling profiles, more preferably all coupling profiles. This means that the coupling profiles as such are not weakened by the grooves, and that the coupling profiles can be shaped in a relatively robust (unweakened) manner, which secures and allows two and more panels to be coupled to each other in a relatively firm, reliable and/or durable manner. This embodiment can still be realized by means of calendering, wherein a profiled calendering roll used to impress and/or preserve already-formed core grooves is provided with discontinuous complementary protrusions. Moreover, in case a subsequent automated sawing or cutting action is required to saw or cut a decorative slab into a plurality of decorative panels, a synchronization between the calendering action and the automated sawing/cutting action is typically required.

By said "horizontal plane" (HP) is meant a (fictive) plane, which extends parallel to the core, and which may intersect the core. By said "vertical plane" (VP) is meant a (fictive) plane at a panel edge, wherein said vertical plane is perpendicular to said horizontal plane (HP). Typically, the vertical plane (VP) coincides with the outer part of a panel edge, which outer part is also referred to as joint edge as this joint edge is configured to engage or face a joint edge of an adjacent panel, in coupled condition of the panels. The joint edge typically has one or more joint surfaces which may be vertical, horizontal, angled, rounded, bevelled etcetera. In case a panel edge, in particular a joint edge, is configured to define a plurality of vertical planes (VP), for example one vertical plane (VP1) coinciding with a joint edge at or near the upper side of the core and one other vertical plane (VP2) coinciding with a or said joint edge at or near a lower side of the core, the core grooves are located at a distance of at least one vertical plane (VP1 and/or VP2), and preferably all vertical planes (VP1 and VP2). It is, however, imaginable that an outer end of the core grooves coincides with a vertical plane of a panel edge. The panel edge may also be interpreted as an edge zone (having a limited width) adjacent to the center portion of the panel. Here, it is also conceivable to indicate that at least one panel edge, preferably each panel edge, is configured to define a plurality of vertical planes (VP), wherein one vertical plane (VP1) coincides with the outer part of a panel edge and at least one other vertical plane (VP2) coincides with a part of a coupling profile of said edge, positioned closest to a centre portion of the core of the panel. Typically, said coupling profile extends from (and including) vertical plane VP1 to vertical plane VP2. It is also imaginable that at least one panel edge, preferably each panel edge, is configured to define a plurality of vertical planes (VP), wherein one vertical plane (VP-O) coincides with a top outer part of said panel edge and wherein at least one vertical plane (VP-I) coincides with a bottom outer part of said panel edge. Here, it is conceivable, and typically the case, that vertical plane VP1 and VP-O are coinciding planes. The same applies to vertical plane VP2 and VP-I, although a (small) distance between VP2 and VP-I may be applied, which is, for example, depicted in FIG. 2a and FIG. 3a. The core grooves are positioned at a distance from at least one of the aforementioned vertical planes, and preferably at least vertical planes VP-O and VP-I, and more preferably each of the vertical planes VP-O (VP1), VP-I, and VP-2. The core grooves are extending vertically in the core, which means that the core grooves extends from the groove opening connected to the lower side and/or upper side of the core, vertically toward an outer end (deepest point) of the groove wall. Typically, each core groove has an elongated shape, wherein each groove, as seen in its longitudinal direction, extends in a direction which coincides with or is parallel to the horizontal plane (HP) of the panel.

It is imaginable that the core comprises a plurality of core layers, such as two or more co-extruded core layers (sublayers), which may subsequently be laminated in a calendering device and/or in an alternative manner. Preferably at least one core layer, more preferably each core layer comprises a thermoplastic polymer. It is however also imaginable that at least one core layer is free of thermoplastic polymer. This allows, for example, that the core is provided with at least two zones (sublayers) of different composition. Such zones may be obtained, for example, by means of co-extrusion. The different compositions in different zones may result in mutually different features, such as, for example, in respect to elasticity, colour, adherence, smoothness of the surface, processability and the like. Different compositions in different zones may, for example, be based upon different ratios between polymeric material, in particular thermoplastic material (like PVC and/or TPU and/or PET and/or PP), and non-polymeric material, in particular filler, more in particular mineral filler (like chalk). For example, to this end, it is imaginable that at least one core layer is relatively stiff or rigid, and another core layer, preferably positioned underneath the first mentioned core layer during normal use, is relatively flexible or soft. Preferably, at least one first core layer has a softer composition and/or a lower Vicat softening point than at least one second core layer. This makes it relatively easy to provide impressions, such as grooves, slots, or alternative cavities, in the first core layer (in viscous state), while the (harder) second core layer can be used to provide the core as such more hardness and/or rigidity. Typically, the Vicat softening point (Vicat softening temperature) is measured according to standards D 1525 and/or ISO 306. It is imaginable that at least two core layers are provided with at least one impressed pattern. It is imaginable and often preferred that a side of at least one core layer, which is provided with at least one impressed pattern, is facing away from an adjacent core layer. Alternatively or additionally, it is also possible that a side of at least one core layer, which is provided with at least one impressed pattern, is facing towards an adjacent core layer. This latter embodiment will enclosing the impressed pattern(s) by said facing core layers. This will typically lead to (air) pockets incorporated within the core as such. The impressed pattern(s) of different core layers may be identical or may be distinctive. At least one of these impressed pattern(s) may be filled, e.g. by a sound dampening material, such as felt, flax, wool, a foamed material, etcetera. It is imaginable that at least one core layer is free of any impressed pattern. At least one core layer may be a reinforcement layer, such as a glass fiber layer and/or a graphene (or derivative thereof) based layer. It is imaginable that at least one core layer is at least partially, preferably substantially entirely, composed of at least one elastic material and/or soft material and/or compressible material. Such a core layer typically improves the user comfort of the panel as such and improves the acoustic properties of the panel. Preferably, such a (comfort) layer comprises a material selected from the group consisting of: a natural rubber, a synthetic rubber, an alternative elastomer, a polyolefin, a foamed polymer, and at least one natural material, preferably a natural material chosen from the group consisting of: cork, bamboo, hemp, linen, flax, jute, sisal, coconut fibers, banana fibers, cotton, felt, and/or leather. The foamed polymer may constitute a closed-cell foam or an open cell foam. Preferably, said foamed polymer is a(n elastically) compressible foamed polymer, such as PVC foam, PU foam, preferably thermoplastic PU (TPU) foam, EVA foam, cross-linked polyethylene foam (XPE), irradiation cross-linked polyethylene foam (IXPE), and expanded polyethylene foam (EPE). XPE foam and IXPE are both closed-cell PE foams, typically with even and fine internal cells are even and fine, wherein the water absorption rate is extremely low, while the sound insulation, heat insulation, shock absorption performance, and mechanical properties are relatively good. It is imaginable that this (comfort) core layer is composed of a plurality of layers, such as e.g. a laminate of at least one polymer (comprising) layer and at least one layer composed of natural material, and/or a laminate of a plurality of polymer (comprising) layers. Non-limitative examples of such laminated core layers are: (i) an EVA layer (ethylene-vinyl acetate) layer with a preferred thickness of between 0.5 and 1.8 mm, laminated with a PE film, with a preferred thickness of between 0.5 and 1.8 mm, and (ii) an expanded polyethylene layer (EPE layer) with a preferred thickness of between 0.5 and 2.5 mm, laminated with a PE film, with a preferred thickness of between 25 micron and 1.5 mm. This comfort core layer and/or any other core layer may be given a desired colour by adding at least one pigment to the core layer. Preferably, at least one colour of at least one core layer is chosen from the group consisting of: white, yellow, blue, red, green, brown, azure, ivory, teal, silver, purple, navy blue, pea green, orange, maroon, aquamarine, coral, fuchsia, wheat, lime, crimson, khaki, pink, magenta, olden, plum, olive, cyan, or s plurality of colours thereof. This colour is typically visible as seen from a side view of the panel. The colour preferably provides an indication of at least one layer related characteristic of the (comfort) core layer, such as e.g. the layer thickness, the density, at least a part of the material composition, the recyclability, the compostability, the temperature resistance, the moisture resistance, the anti-bacterial properties, the compressibility, the swell rating, the compressive strength, and/or the acoustic dampening (sound absorption). The (comfort) core layer may be provided with a impressed pattern, such as e.g. a waffle pattern and/or a matrix pattern, although alternative patterns are also imaginable. This may improve the comfort properties of the panel, the acoustic properties of the panel, and will lead to an increased contact surface area between the (comfort) core layer and an adjacent layer, which typically will intensify the bonding of said layers. Optionally, at a rear side of the core at least one backing layer may be applied, which typically (further) improves the comfort properties and acoustic properties of the panels. Preferred materials for the backing layer are a natural rubber, a synthetic rubber, an alternative elastomer, a polyolefin, a foamed polymer, such as EPE, XPE, and IXPE, and at least one natural material, preferably a natural material chosen from the group consisting of: cork, bamboo, hemp, linen, flax, jute, sisal, coconut fibers, banana fibers, cotton, felt, and/or leather. The one or more backing layers may be closed and may act as sound dampening membrane. In case more backing layers are applied, these backing layer are preferably laminated on top of each other. It is also imaginable that the backing layer(s) is/are provided with through-holes connecting to the impressed pattern(s), if applied, at a rear side of the core.

At least one core layer may be at least partially be composed of recycled material, preferably a mixture of virgin and recycled material of the same polymer (type). Preferably, in case a plurality of core layers is applied, these core layers are predominantly based upon the same polymer, such as PET, PP, PU, PE, or PVC, to facilitate post-use panel recycling.

Preferably, an elastic and/or compressible and/or soft core layer is situated as intermediate core layer in between two more rigid core layers and/or harder core layers (typically having a higher shore (A) hardness), which leads to a (ABA) sandwich structure. The layers may be glued to each other, but are preferably fused (heat welded) to each other. Such a sandwich structure typically leads to improved ergonomics and sound dampening properties of the core as such, and hence of the panel as such. Such a sandwich pattern typically also allows the upper core layer and the lower core layer to be moved, in particular shift, with respect to each other, due to the flexible (elastic) intermediate core layer situated in between these core layers. This freedom of movement between the upper core layer and the lower core layer is typically restricted to several nanometre up 1 millimetre, but this allows the core, and hence the panel, to compensate external forces during normal use and/or during possible expansion or contraction as a result of temperature difference during use. Such as compensation will be in favour of the user comfort and/or lifetime of the panel. Preferably, at least one of these core layers is provided with at least one impressed pattern. It is imaginable that at least one impressed pattern leads to at least one through-hole, typically a pattern of through-holes through a core layer and/or through the core. It is however also conceivable that each core layer is free of any impressed patterns.

Preferably, the thickness of the upper core layer is smaller than the thickness of the lower core layer, but larger than the thickness of the intermediate core layer. Preferably, an upper core layer has a thickness situated in between 0.8 and 3 mm, more preferably between 1 and 1.5 mm. Preferably, a lower core layer has a thickness in between 2 and 5 mm, preferably between 3.5 and 4.5 mm, which e.g. provides sufficient mass to realize relatively deep impressions in, preferably a lower side, of said lower core layer. These impressions preferably have a (maximum) thickness of between 1 and 3 mm, more preferably between 1 and 2 mm. The intermediate layer preferably has a thickness of between 0.5 and 2 mm, more preferably approximately 1 mm. Typically, the upper core layer and lower core layer comprises a composite material which is at least partially composed of a thermoplastic material, such as PVC, TPU, PET, PP, and at least one filler, such as calcium carbonate. This will typically provide the core layers are darker colour, in particular a greyish, grey, or blackish colour, which could lead to a desired colour contrast between these darker core layers and at least one other, preferably intermediate coloured core layer, wherein, as said, the colour may indicate one or more characteristics of the core layer and/or of the core and/or of the panel as such.

Preferably, the width of the groove opening of at least one core groove is larger than the width of an inner part of said core groove. Preferably, at least a part of at least one core groove has a trapezium-shaped cross-section, wherein core groove narrows down in an upward direction facing away from the groove opening. This converging shape of the core groove(s) towards the groove opening could further improve the acoustic properties (sound dampening properties) of the panel as such. Moreover, this embodiment allows to realize a serious material saving while keeping the contact surface of the lower side of the core to a backing layer (or separate subfloor) relatively large which is in favour of the stability, durability and the robustness of the panel.

It is imaginable that the width of the groove opening of at least one core groove is substantially equal to the width of an inner part of said core groove. This groove shape is typically relatively easy to realize during the extrusion process. In this embodiment, the core grooves comprises at least two core groove side walls oriented in parallel with respect to each other.

At least one core groove may be a discontinuous core groove. This means that the core groove is composed of a plurality of distant core groove segments which are typically situated in line.

It is imaginable that at least two core grooves may have mutually different shapes and/or dimensions. More in particular, it may be preferred that inner core grooves are formed with a smaller groove depth (GD) and/or smaller groove width (GW) than outer core grooves, wherein said inner grooves are located at a greater distance from a panel edge than said outer core grooves.

Typically the core grooves are air-filled. However, it is also imaginable that at least one core groove is filled with at least one solid and/or liquid material. Preferably, this filling material is cheaper than the polymer and/or other ingredients (additives) used in the core. Examples of a cheap filling material are solid wood, wood chips, wood dust, wood fibre, hemp fibre, and mineral fillers, such as chalk (calcium carbonate). By at least partially filling at least one core groove, and preferably all core grooves, the panel is provided different properties, such as for example an increased sound reduction.

It is also imaginable and even preferable that at least a number of core grooves, preferably all core grooves are filled with an elastic material, typically strip-shaped, preferably made from an anisotropic material, wherein said elastic material (co-)defines the lower side of the panel. The application of such a material could seriously increase the friction between the panel and an underlying subfloor, and hence could seriously improve the stability of the panel with respect to said subfloor. Preferably, said elastic material is merely present within the core groove(s), and hence does preferably not cover parts of the lower side of the core situated in between core grooves. It could be additionally advantageous in case a plurality of superficial suction holes is formed in at least a lower surface of said elastic material, wherein the superficial suction holes are open in a direction facing away from the core and substantially closed in a direction facing the core. More preferably, the superficial suction holes together define a void footprint, wherein material at the lower surface of the elastic material in between said superficial suction holes define a material footprint, wherein the ratio between the void footprint and the material footprint is at least 4, preferably at least 5, more preferably at least 6, thereby allowing the panel to be quickly (releasably) attached to a support surface and removed therefrom (without using glue). Hence, the elastic material provided with the suction holes constitutes a self-bonding material, which provides the panel as such a self-bonding property. Here, it is preferably that the thickness of the elastic material is preferably substantially equal to or (slightly) larger than the depth of the core groove(s). The elastic material is typically an elastic foam. In one embodiment, the elastic material is made from a foam material composed of ethylene vinyl acetate (EVA), which is a copolymer of ethylene and vinyl acetate, rubber, polyurethane (PU), polyethylene (PE), polypropylene (PP), polystyrene (PS), (plasticized) polyvinylchloride (PVC), or mixtures thereof. The elastic material may optionally include other components, such as a filler, such as chalk, talc, sand, fibre, wood, mineral, and/or carbon; a foaming agent, such as azodicarbonamide, a crosslinking agent, such as dicumyl peroxide, a foaming agent, such as zinc oxide; and/or a colouring agent. Preferably, the elastic material of the panel according to the present invention provides a rubber foam-like material with regard to softness and flexibility. The material has low-temperature toughness, stress-crack resistance, waterproof properties, air-tight sealing properties, and foam recovery after compression. In a preferred embodiment a number or substantially all of the suction holes have a diameter situated in between 5 $\mu$m to approximately 1 mm, preferably in between 10 $\mu$m and 500 $\mu$m, more preferably between 10 and 300 $\mu$m. The density of the elastic layer may vary along the thickness of the elastic layer. For example, the density of the elastic layer may range from about 30 kg/m3 to about 280 kg/m3. In another preferred embodiment, the diameter of the suction holes is between 1 $\mu$m and 450 $\mu$m, in particular between 2 $\mu$m and 400 $\mu$m, more in particular between 4 $\mu$m and 350 $\mu$m. Such distribution ensures an equal distribution of suction holes over the bottom surface of the tiles, with suitably shaped holes for suction, or attachment, onto the subsurface.

In an alternative imaginable and even preferable embodiment, at least a number of core grooves, preferably all core grooves are filled with a, typically strip-shaped, absorptive element, which absorptive element preferably includes a plurality of fibres which are at least partially impregnated with a pressure sensitive adhesive, preferably a hot melt pressure sensitive adhesive. Typically, the absorptive element is glued onto the core groove wall(s), by using a dedicated permanent adhesive, such as acrylate adhesive, PVC paste resins, epoxy glue, phenol glue, vinyl adhesive, polyurethane adhesive, amino resin adhesive, etcetera. The fibres are kept in place by, and may be implanted into, the permanent adhesive. The fibres may be cotton fibre, glass fibre, synthetic fibre, blended fibre, etcetera. The synthetic fibre may be viscose fibre, polyester fibre, nylon, polyacrylonitrile fibre, polyvinyl chloride fibre, polyvinyl alcohol fibre, etcetera. The blended fibre includes at least two different fibres in a single fibre strand or yarn, and the blended fibre may be a blend of e.g. polyester/cotton, nylon/wool, nylon/acetate, ramie/polyester, ramie/acrylic, wool/cotton, linen/cotton, linen/silk, linen/rayon, etcetera. The absorptive element typically includes a soft (flexible) substance with a Shore hardness in the range of 20°-60°. The soft substance preferably has a plurality of fine or wick structures such as fine pores or fine apertures which could be penetrated by fluid. The soft substance may be fibres or sponge. The thickness of the absorptive element is preferably substantially equal to or (slightly) larger than the depth of the core groove. Preferably, the absorptive element(s) is/are merely provided in the core grooves and are thus not provided at parts of the lower side of the core extending in between the core grooves. This allows the absorptive element to engage an underlying surface, in order to realize a bonding force between the panel and the underlying surface upon pushing the panel against the surface. Hence, also this embodiment provides the panel according to the invention self-bonding properties, without using separate glue.

The lower side (rear side) of the core may also constitute the lower side (rear side) of the panel as such. However, it is thinkable, and it may even be preferable, that the panel comprises a backing layer, either directly or indirectly, affixed to said lower said of the core. Typically, the backing layer acts as balancing layer in order to stabilize the shape, in particular the flatness, of the panel as such. Moreover, the backing layer typically contributes to the sound dampening properties of the panel as such. As the backing layer is typically a closed layer, the application of the backing layer to the lower side of the core will cover the core grooves at least partially, and preferably entirely. Here, the length of each core groove is preferably smaller than the length of said backing layer. The backing layer may be provided with cut-out portions, wherein at least a part of said cut-out portions overlap with at least one core groove. The at least one backing layer is preferably at least partially made of a flexible material, preferably an elastomer. The thickness of the backing layer typically varies from about 0.1 to 2.5 mm. Non-limiting examples of materials of which the backing layer can be at least partially composed are polyethylene, cork, polyurethane, polyvinylchloride, and ethylene-vinyl acetate. Optionally, the backing layer comprises one or more additives, such as fillers (like chalk), dyes, and/or one of more plasticizers. The thickness of a polyethylene backing layer is for example typically 2 mm or smaller. The backing layer may either be solid or foamed. A foamed backing layer may further improve the sound dampening properties. A solid backing layer may improve the desired balancing effect and stability of the panel.

The panel preferably comprises at least one reinforcement layer and/or reinforcing particles, which preferably extend(s) (and is/are present) in only one coupling profile of the first and second coupling profile, and extend(s) (and is/are present) in only one coupling profile of the third and fourth coupling profile. This means that at least two coupling profiles are reinforced and at least two other coupling are not reinforced by the reinforcement layer and/or reinforcing particles. The reinforcing particles may be separate reinforcing particles dispersed within the core. The reinforcing layer may, for example, by formed by a closed layer, a woven layer, or a non-woven layer. Suitable materials for realizing the reinforcement layer and/or reinforcement particles are glass, polymer, carbon, and metal.

In a preferred embodiment, the first coupling profile and/or the third coupling profile comprises: an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, preferably provided at a distant side of the upward tongue facing away from the upward flank, and wherein the second coupling profile and/or the fourth coupling profile comprises: a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favourite in the aerospace industry;

Polyphenylene sulphide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

In the abovementioned embodiment, it is imaginable that the first coupling profile (and/or third coupling profile) and the second coupling profile (and/or fourth coupling profile)

are configured such that in coupled condition a pretension is existing, which forces coupled panels at the respective edges towards each other, wherein this preferably is performed by applying overlapping contours of the first coupling profile (and/or third coupling profile) and the second coupling profile (and/or fourth coupling profile), in particular overlapping contours of downward tongue and the upward groove and/or overlapping contours of the upward tongue and the downward groove, and wherein the first coupling profile (and/or third coupling profile) and the second coupling profile (and/or fourth coupling profile) are configured such that the two of such panels can be coupled to each other by means of a fold-down movement and/or a vertical movement, such that, in coupled condition, wherein, in coupled condition, at least a part of the downward tongue of the second coupling profile (and/or fourth coupling profile) is inserted in the upward groove of the first coupling profile (and/or third coupling profile), such that the downward tongue is clamped by the first coupling profile (and/or third coupling profile) and/or the upward tongue is clamped by the second coupling profile (and/or fourth coupling profile).

It is imaginable that the first coupling profile is configured to co-act with the second coupling profile as well as with the fourth coupling profile, and that the third coupling profile is also configured to co-act with the second coupling profile as well as with the fourth coupling profile.

In an embodiment of the panel according to the invention, the first coupling profile and/or the third coupling profile comprises: a sideward tongue extending in a direction substantially parallel to the upper side of the core, at least one second downward flank lying at a distance from the sideward tongue, and a second downward groove formed between the sideward tongue and the second downward flank, and wherein the second coupling profile and/or the fourth coupling profile comprises: a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

It is conceivable that each first coupling profile and each third coupling profile is compatible—hence may co-act and interlock—with each second coupling profile and each fourth coupling profile. This may also apply in case interlocking coupling profiles do not have a completely complementary shape.

In a preferred embodiment, at least coupling profile, and preferably all coupling profiles, is/are at least partially formed by the core.

As indicated above, the core is preferably at least partially made of at least one polymer, in particular a thermoplastic material and/or a thermoset material, wherein, preferably, the core comprises a composite comprising at least one polymer, in particular a thermoplastic material and/or a thermoset material, and at least one non-polymeric material. Said non-polymeric material preferably at least one material selected from the group consisting of: steel, glass, polypropylene, wood, acrylic, alumina, curaua, carbon, cellulose, coconut, kevlar, nylon, perlon, rock wool, sisal, fique, a mineral filler, in particular chalk. This may further increase the strength of the panel and/or the water resistivity and/or the fireproof properties of the panel as such, and/or may lower the cost price of the panel as such.

Preferably, the base material of the core, or at least one core layer, comprises a (main) polymer, preferably a thermoplastic material, which is more preferably chosen from the group consisting of: PVC, PET, PP, PS, thermoplastic polyurethane (TPU), PE, in particular MDPE and/or HDPE; and combinations thereof. PS may be in the form of expanded PS (EPS) in order to further reduce the density of the floor covering element, which leads to a saving of costs and facilitates handling of the panels. Also in case another thermoplastic material is used, this material may be applied in foamed state in the core to reduce the density and costs. Nevertheless, it is also imaginable that the thermoplastic material used as main polymer is a solid polymer (i.e. an unfoamed polymer). Preferably, at least a fraction of the polymer used may be formed by recycled thermoplastic, such a recycled PVC or recycled PU. It is conceivable that a mix of virgin and recycled thermoplastic material is used to compose at least a part of the core. Instead of the thermoplastic material, also a thermoset polymer may be used, such as thermoset polyurethane.

At least a part of the core may be made of a composite of at least one polymer and at least one non-polymeric material. The composite of the core layer preferably comprises one or more fillers, wherein at least one filler is preferably selected from the group consisting of: talc, chalk, wood, calcium carbonate, titanium dioxide, calcined clay, porcelain, glass, carbon particles, silicon particular, a(nother) mineral filler, a(nother) natural filler, a(nother) (auxiliary) polymer, such as an elastomer and/or latex. It is also imaginable that rubber and/or elastomeric parts (particles) are dispersed within the composite to improve the flexibility and/or impact resistance at least to some extent. The core may (thus) be rigid, semi-flexible, or flexible, and so can be the floor covering element as such. The filler may be formed by fibres, such as glass fibers or synthetic or genuine leather fibers, and/or may be formed by dust-like particles. Here, the expression "dust" is understood as small dust-like particles (powder), like bamboo dust, wood dust, cork dust, or non-wood dust, like mineral dust, stone powder, in particular cement, and combinations thereof. The average particle size of the dust is preferably between 14 and 20 micron, more preferably between 16 and 18 micron. The primary role of this kind of filler is to provide the core, and the panel as such, sufficient hardness and/or to decrease the cost price of the core, and hence of the panel. Moreover, this kind of filler will typically also improve the impact strength of the core and of the panel as such. Preferably, the filler content in the composite material of the core is between 30 and 75% by weight of the composite material of the core, more preferably between 50 and 60% by weight of the composite material of the core. Preferably, the polymer content in the composite material of the core is between 25 and 70% by weight of the composite material of the core, more preferably between 40 and 50% by weight of the composite material of the core. The polymer can either be foamed or unfoamed. Preferably, the composite of the core comprises at least one filler selected from the group consisting of: a salt, a stearate salt, calcium stearate, and zinc stearate. Stearates have the function of a stabilizer, and lead to a more beneficial processing temperature, and counteract decomposition of components of the composite during processing and after processing, which therefore provide long-term stability. Instead of or in addition to a stearate, for example calcium zinc may also be used as stabilizer. The weight content of the stabilizer(s) in the composite will preferably be between 1 and 5%, and more preferably between 1.5 and 4%. The composite of the core preferably comprises at least one impact modifier comprising at least one alkyl methacrylate, wherein said alkyl methacrylate is preferably chosen from the group consisting of: methyl methacrylate, ethyl methacrylate, propyl methacrylate, isopropyl methacrylate, t-butyl methacrylate and isobutyl methacrylate. The impact modifier typically improves the product performance, in particular the impact resistance. Moreover, the impact modifier typically toughens the core layer and can therefore also be seen as toughening agent, which further reduces the risk of breakage. Often, the modifier also facilitates the production process, for example, as already addressed above, in order to control the formation of the foam with a relatively consistent (constant) foam structure. The weight content of the impact modifier in the composite will preferably be between 1 and 9%, and more preferably between 3 and 6%. At least one plastic material used in the core layer is preferably free of any (toxic) plasticizer in order to increase the desired rigidity of the core layer, which is, moreover, also favourable from an environmental point of view. The core and/or another layer of the panel may comprise wood-based material, for example, MDF, HDF, wood dust, bamboo, prefabricated wood, more particularly so-called engineered wood. This wood-based material may be part of a composite material of the core. Alternatively, the core is at least partially composed of another base material, such as a mineral material, like magnesium oxide, magnesium hydroxide, gypsum, (lightweight) concrete, and/or clay; and/or a wood or a wood-based material, such as HDF or MDF, or any other thermoplastic-free material, may be used as base material.

The density of the core typically varies from about 0.1 to 1.5 grams/cm3, preferably from about 0.2 to 1.4 grams/cm3, more preferably from about 0.3 to 1.3 grams/cm3, even more preferably from about 0.4 to 1.2 grams/cm3, even more preferably from about 0.5 to 1.2 grams/cm3, and most preferably from about 0.6 to 1.2 grams/cm3. It is imaginable that each panel comprises a plurality of core (sub)layers. Different core (sub)layers may have either identical compositions or different compositions, and/or different densities.

The decorative top structure preferably comprises at least one decorative layer and at least one transparent wear layer covering said decorative layer. The decorative top structure may additionally comprise at least one back layer situated in between said decorative layer and the core, wherein said back layer is preferably at least partially made of a vinyl compound, wood, paper, textile, such as cotton and/or recycled jeans (denim), and/or combinations thereof. The one or more materials used in said at least one back layer may virgin materials, recycled materials, and combinations thereof. Here, it is for example imaginable and even preferred that the back layer comprises a mixture of wood, cotton, preferably recycled cotton, more preferably recycled cotton based upon recycled jeans (denim), and/or virgin cotton; and at least one binding agent. The recycled cotton can be post-consumer recycled cotton, being a type of cotton that comes from garments which have been sold to and used by the consumer, such as jeans. Additionally or alternatively, the recycled cotton can be pre-consumer recycled cotton (cutting waste), which is a type of cotton that comes from the waste that is produced in the manufacturing process. Preferably, the back layer comprises wood in an amount of 20-60% by weight of the back layer, and a cotton based material, such as recycled jeans and/or raw cotton (virgin cotton), in an amount of 30-70% by weight of the back layer, and at least one binding agent, preferably in an amount of 1-7% by weight of the back layer. The back layer may be free of PVC and/or any other synthetic polymer. Optionally, the back layer may act as decorative layer (which does not require a separate decorative layer on top).

A lacquer layer or other protective layer may be applied on top of said wear layer. The protective layer and/or wear layer preferably comprises silicon oxide (SiO2). A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities. It is imaginable and may even be preferred that the decorative layer comprises at least one recycled material and/or at least one natural material, such as e.g. wood, coffee (e.g. coffee grounds, and/or ground coffee, and/or coffee powder, and/or coffee chaff), textile, in particular recycled jeans material, and/or mixtures thereof, for example a mixture of wood and a coffee based material. In this latter embodiment, the decorative layer may e.g. comprise wood in an amount of 40-80% by weight of the decorative layer, and a coffee based material, such as coffee grounds and/or coffee chaff, in an amount of 10-50% by weight of the decorative layer, and at least one binding agent, preferably in an amount of 1-7% by weight of the decorative layer. The decorative layer may be free of PVC and/or any other synthetic polymer. Customized appearances, often realized by digital printing during the panel production process, are also imaginable. The decorative top structure may also be formed by a single layer. In an alternative embodiment, the decorative top structure is omitted, thus not applied, in the panel according to the invention. In this latter embodiment, the upper side of the core constitutes the upper side of the panel.

The decorative layer may be formed at least partially by a (digitally) printed plastic layer, in particular a thermoplastic layer, or a (digitally) printed film, in particular paper film or thermoplastic film. The plastic material, in particular the thermoplastic material, is used can be of various nature, but commonly PVC or PU, in particular TPU, is preferred as material. Preferably this (thermo)plastic layer or paper film is preferably a white plastic layer or white film, preferably an opaque white layer or opaque white film. White, and in particular opaque white, will provide a bright background which will reflect back to the viewer the light that travels through transparent ink colours.

The decorative layer may also be formed by an ink layer printed, preferably digitally printed, either directly or indirectly onto the core. The decorative layer may at least partially made of at least one biobased material, such as a polymer, in particular TPU, based upon plant-based oils such as canola oil or castor oil. The decorative may additionally comprise mineral components such as chalk. This combines sustainability with extremely high levels of resilience for an improved panel performance in terms of acoustic properties, indentation resistance, etcetera.

The decorative top structure may also comprise and/or constitute a carpet base having pile yarns projecting upwardly therefrom. The pile yarns can be made from a number of natural or synthetic fibres. Many types of yarn are made differently though, wherein there are typically two main types of yarn: spun and filament. The yarns may be made of nylon but other suitable synthetic yarns such as polyester, polypropylene, acrylic or blends thereof can be employed. The carpet tile may be either rigid or flexible. It is also conceivable that the base is free of any yarn or fibres. The pile yarns may consist of loop piles. It is however also possible that the pile yarns consist of cut piles, twisted piles or any other suitable pile yarns in for example a level- or multilevel configuration. The loop piles are possibly synthetic yarns, such as nylon, polyester, polypropylene, acrylic or blends thereof. In the shown embodiment, the loop piles are tufted in the carpet base. The carpet base preferably also comprises a backing sheet, which can for example be a non-woven sheet, a woven sheet, a non-woven polyester sheet, a polypropylene sheet, a glass fibre scrim or tissue sheet or combinations thereof. The backing sheet typically acts as support structure (holding structure) for holding the yarns. To more efficiently bond the tufts in position on the carpet base, and in particular on the backing sheet, preferably a pre-coat layer is applied. This pre-coat layer can for example be a latex layer.

The panel thickness is typically situated in between 3 and 10 mm, preferably between 4 and 8 mm.

Preferably, the core grooves run substantially parallel. Preferably, the total surface area of the groove openings covers at least 20%, preferably at least 30%, more preferably at least 40%, of the total surface area of the lower side of the core.

Preferably, at least one panel edge is at least partially formed by at least one core edge, and wherein, preferably, each panel edge is at least partially formed by a core edge. It is imaginable that the decorative structure additionally also defined at least a part of the panel edge, or all panel edges.

The core is preferably extended along an extrusion direction, and wherein the grooves extend in said extrusion direction. Thus, the core grooves preferably extend in the extrusion direction.

The invention also relates to a decorative covering, in particular a decorative floor covering, decorative ceiling covering, or decorative wall covering, comprising a plurality of mutually coupled decorative panels according to the invention.

The invention further relates to a core for use in a panel according to the invention.

The invention moreover relates to a system for producing a decorative panel, in particular a decorative panel according to the invention, comprising:

at least one extruder for extruding a liquified polymer based core composition to form a soft core sheet, and at least two facing calendering rolls positioned downstream of said extruded, wherein at least one calendering roll is provided with a profiled outer surface configured to abut a side of the soft core sheet provided and/or to be provided with core grooves.

Preferably, the extruder is configured to provide an upper side and/or a lower side of the core sheet with core grooves, and wherein the at least one profiled calendering roll is configured to preserve and/or (slightly) deform said core grooves. Preferably the number and/or width and/or depth of core grooves provided by the extruder corresponds to the number and/or width and/or depth of annular elevations provided at the outer surface of the profiled calendering roll.

The invention additionally relates to a method of producing a decorative panel, in particular a decorative panel according to the invention, comprising the steps of:

A) liquifying a polymer based core composition;

B) extruding said liquified polymer based core composition to form a soft core sheet;

C) guiding said soft sheet in between calendering rolls, (i) wherein during extrusion according to step B) at least one pattern, in particular a plurality of core grooves, is formed at an upper side and/or lower side of said core sheet, which pattern is substantially preserved when the guiding core sheet in between the calendering rolls; and/or (ii) wherein at least one calendering roll is profiled to impress at least one pattern, in particular a plurality of core grooves, into an upper side and/or lower side of said core sheet, D) allowing the core sheet provided with the core grooves to solidify;

E) applying a decorative top structure, either directly or indirectly, onto the upper side of the core sheet, such that a decorative plate is formed; and F) cutting or sawing the decorative plate into a plurality of decorative panels, and G) machining the panel edges of each decorative panel, such that a first panel edge is provided with a first coupling profile, and a second panel edge is provided with a second coupling profile being designed to engage interlockingly with said first coupling profile of an adjacent panel, preferably both in horizontal direction and in vertical direction, and preferably such that a third panel edge is provided with a third coupling profile, and a fourth panel edge comprising a fourth coupling profile being designed to engage interlockingly with said third coupling profile of an adjacent panel, preferably both in horizontal direction and in vertical direction. Preferably, during step D) the extruded core is actively cooled down, preferably by means of cooling water.

The invention also relates to a profiled calendering roll for use in the system according to the invention and/or the method according to the invention. The calendering roll is intended (i) to impress at least one pattern and/or core grooves into an upper surface and/or lower surface of the core during calendering and/or (ii) to preserve already-(pre)formed core grooves, wherein said preformed core grooves are preferably realized by means of extrusion.

The ordinal numbers used in this document, like "first", "second", and "third" are used only for identification purposes. Hence, the use of the expressions "third locking element" and "second locking element" does therefore not necessarily require the co-presence of a "first locking element".

By "complementary" coupling profiles is meant that these coupling profiles can cooperate with each other. However, to this end, the complementary coupling profiles do not necessarily have to have complementary forms. By locking in "vertical direction" is meant locking in a direction perpendicular to the plane of the tile. By locking in "horizontal direction" is meant locking in a direction perpendicular to the respective coupled edges of two tiles and parallel to or falling together with the plane defined by the tiles. In case in this document reference is made to a "floor tile" or "floor panel", these expressions may be replaced by expressions like "tile", "wall tile", "ceiling tile", "covering tile". In the context of this document, the expressions "foamed composite" and "foamed plastic material" (or "foam plastic material") are interchangeable, wherein in fact the foamed composite comprises a foamed mixture comprising at least one (thermos)plastic material and at least one filler (non-polymeric material).

Preferred embodiments of the invention are set out in the non-limitative set of clauses presented below.

Clauses

1. Decorative panel, in particular a floor panel, ceiling panel or wall panel, comprising:
   a calendered, and preferably extruded, core composed of at least one core layer, wherein said core is provided with an upper side and a lower side,
   a decorative top structure, either directly or indirectly, affixed on said upper side of the core,
   a first panel edge preferably comprising a first coupling profile, and a second panel edge preferably comprising a second coupling profile being designed to engage interlockingly with said first coupling profile of an adjacent panel, both in horizontal direction and in vertical direction,
   wherein the upper side and/or the lower side of at least one core layer and/or the core is preferably provided with at least one impressed pattern which preferably comprises one or more impressed core grooves, realised by means of extrusion and/or calendering.

2. Panel according to clause 1, wherein at least two opposing edges of each core groove are at least partially, preferably entirely curved, in particular convexedly curved and/or concavedly curved.

3. Panel according to clause 2, wherein the core grooves are elongated, and wherein at least two opposing longitudinal edges of each groove are at least partially, preferably entirely, curved, in particular convexedly curved and/or concavedly curved.

4. Panel according to clause 2 or 3, wherein the curved edges of each groove are sigmoidally curved.

5. Panel according to one of the foregoing clauses, wherein at least two core grooves extend in parallel directions.

6. Panel according to clause 5, wherein the maximum core groove width of each core groove exceeds the distance in between adjacent grooves.

7. Panel according to one of the foregoing clauses, wherein each core groove comprises at least one circumferential edge enclosing a groove bottom, wherein at least a part of the at least one circumferential edge is formed by stretched material, and wherein the at least a part of the groove bottom is formed by compressed material.

8. Panel according to one of the foregoing clauses, wherein that the lower side and/or upper side of the core has substantially the same surface texture as at least a part of each core groove, and preferably wherein that the lower side and/or upper side of the core and the core grooves have substantially the same surface texture.

9. Panel according to one of the foregoing clauses, wherein the lower side and/or upper side of the core and the core grooves have a substantially smooth surface texture.

10. Panel according to one of the foregoing clauses, wherein each core groove comprises at least one circumferential edge enclosing a groove bottom, wherein the core groove depth (GD), as defined by the surface of the groove bottom, of at least one core groove varies along the core groove length.

11. Panel according to one of the foregoing clauses, wherein each core groove comprises at least one circumferential edge enclosing a groove bottom, wherein the groove bottom of at least one core groove is profiled, wherein more preferably the groove bottom is provided with a patterned profiled surface, in particular a spike patterned profiled surface.

12. Panel according to clause 11, wherein the spike patterned profile surface is at least partially formed by a pattern of frustoconically shaped spikes.

13. Panel according to one of the foregoing clauses, wherein the core groove depth (GD) of at least one core groove is smaller than 0.3 times a panel thickness (T), more preferably wherein the core groove depth (GD) of at least one core groove is smaller than 0.2 times the panel thickness.

14. Panel according to one of the foregoing clauses, wherein at least one groove, and preferably each groove, extends to and connects different edges, in particular to opposing edges, of the panel.

15. Panel according to one of the foregoing clauses, wherein the panel is oblong, wherein at least two core grooves extends in longitudinal direction of the panel.

16. Panel according to one of the foregoing clauses, wherein the panel is oblong, wherein at least two core grooves extends in transverse direction of the panel.

17. Panel according to one of the foregoing clauses, wherein each panel edge defines at least one vertical plane (VP) perpendicular to a horizontal plane (HP), which horizontal plane (HP) is parallel to the core, wherein the entire part of the core grooves is arranged inside the vertical planes (VP) respectively defined by at least two opposing panel edges, such the core grooves do not intersect any coupling profile of the first coupling profile and the second coupling profile.

18. Panel according to one of the foregoing clauses, wherein a third panel edge comprising a third coupling profile, and a fourth panel edge comprising a fourth coupling profile being designed to engage interlockingly with said third coupling profile of an adjacent panel, both in horizontal direction and in vertical direction.

19. Panel according to clause 17 and 18, wherein the entire part of the core grooves is arranged inside the vertical planes (VP) respectively defined by all panel edges, such the core grooves do not intersect any coupling profile of the first coupling profile, the second coupling profile the third coupling profile, and the fourth coupling profile.

20. Panel according to one of the foregoing clauses, wherein the core comprises at least one thermoplastic polymer, such as polyvinyl chloride and/or thermoplastic polyurethane.

21. Panel according to one of the foregoing clauses, wherein at least one core groove is a discontinuous core groove.

22. Panel according to one of the foregoing clauses, wherein at least two core grooves have mutually different shapes.

23. Panel according to one of the foregoing clauses, wherein at least one core groove is filled with material.

24. Panel according to one of the foregoing clauses, wherein the panel comprising a backing layer, either directly or indirectly, affixed to said lower said of the core.

25. Panel according to one of the foregoing clauses, wherein the core comprises a laminate of a plurality of core sublayers, preferably co-extruded sublayers, wherein at least two sublayers are at least partially made of polymer, and wherein the core grooves are impressed into at least one sublayer.

26. Panel according to one of the foregoing clauses, wherein the panel comprises at least one reinforcement layer situated at a distance from the core grooves of the panel.

27. Panel according to one of the foregoing clauses, wherein the first coupling profile and/or the third coupling profile comprises:

an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, preferably provided at a distant side of the upward tongue facing away from the upward flank, and wherein the second coupling profile and/or the fourth coupling profile comprises:

a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

28. Panel according to any of the foregoing clauses, wherein the first coupling profile and/or the third coupling profile comprises:

a sideward tongue extending in a direction substantially parallel to the upper side of the core, at least one second downward flank lying at a distance from the sideward tongue, and a second downward groove formed between the sideward tongue and the second downward flank, and wherein the second coupling profile and/or the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

29. Panel according to one of the foregoing clauses, wherein at least coupling profile, and preferably all coupling profiles, is/are at least partially formed by the core.

30. Panel according to one of the foregoing clauses, wherein the decorative top structure comprises at least one decorative layer and at least one transparent wear layer covering said decorative layer.

31. Panel according to clause 30, wherein the decorative top structure comprises at least one back layer situated in between said decorative layer and the core, wherein said back layer is preferably made of a vinyl compound.

32. Panel according to one clauses 30-31, wherein the decorative layer is formed by a printed thermoplastic film.

33. Panel according to one clauses 30-32, wherein the decorative layer is formed by an ink layer printed, preferably digitally printed, either directly or indirectly onto the core.

34. Panel according to one of the foregoing clauses, wherein the panel thickness is situated in between 3 and 10 mm.

35. Panel according to one of the foregoing clauses, wherein the total surface area of the groove openings covers at least 20%, preferably at least 30%, more preferably at least 40%, of the total surface area of the lower side of the core.

36. Panel according to one of the foregoing clauses, wherein at least one panel edge is at least partially formed by at least one core edge, and wherein, preferably, each panel edge is formed by a core edge.

37. Panel according to one of the foregoing clauses, wherein the core is extended along an extrusion direction, and wherein the grooves extend in said extrusion direction.

38. Panel according to one of the foregoing clauses, wherein the core comprises a centre portion and a peripheral portion enclosing said centre portion, wherein the panel edges and coupling profiles make part of said peripheral portion, and wherein said peripheral portion is free of core grooves.

39. Panel according to one of the foregoing clauses, wherein a centre portion of said impressed pattern comprises impressed core grooves having a depth which exceeds a depth of impressed core grooves of at least one peripheral portion of the impressed pattern.

40. Panel according to one of the foregoing clauses, wherein the core comprises a centre portion and a peripheral portion enclosing said centre portion, wherein the panel edges and coupling profiles make part of said peripheral portion of the core, wherein the peripheral portion of the core encloses said at least one peripheral portion of the impressed pattern, and wherein said peripheral portion of the core is free of core grooves.

41. Panel according to one of the foregoing clauses, wherein the depth of the impressed core grooves of the least one peripheral portion of the impressed pattern decreases towards an adjacent panel edge.

42. Panel according to one of the foregoing clauses, wherein at least one, preferably each, core groove comprises at least one circumferential edge enclosing a groove bottom, wherein groove bottom has the shape of a pyramid, in particular a square pyramid or a hexagonal pyramid.

43. Panel according to one of the foregoing clauses, wherein at least one, preferably each, core groove comprises at least one circumferential edge enclosing a groove bottom, wherein the circumferential edge is tapered towards the groove bottom.

44. Panel according to one of the foregoing clauses, wherein said at least one peripheral portion of the impressed pattern defines a circumferential peripheral portion of the impressed pattern enclosing the centre portion of the impressed pattern.

45. Decorative covering, in particular a decorative floor covering, decorative ceiling covering, or decorative wall covering, comprising a plurality of mutually coupled decorative panels according to any of clauses 1-44.

46. Core for use in a panel according to any of clauses 1-44.

47. System for producing a decorative panel, in particular a decorative panel according to one of clauses 1-44, comprising:

at least one extruder for extruding a liquified polymer based core composition to form a soft core sheet, and at least two facing calendering rolls positioned downstream of said extruded, wherein at least one calendering roll is provided with a profiled outer surface configured to abut a side of the soft core sheet provided and/or to be provided with core grooves.

48. System according to clause 47, wherein the extruder is configured to provide an upper side and/or a lower side of the core sheet with core grooves, and wherein the at least one profiled calendering roll is configured to preserve and/or deform said core grooves.

49. Method of producing a decorative panel, in particular a decorative panel according to one of clauses 1-44, comprising the steps of:

A) liquifying a polymer based core composition;

B) extruding said liquified polymer based core composition to form a soft core sheet;

C) guiding said soft sheet in between at least two facing calendering rolls, (i) wherein during extrusion according to step B) at least one pattern, in particular a plurality of core grooves, is formed at an upper side and/or lower side of said core sheet, which pattern is substantially preserved when the guiding core sheet in between the calendering rolls; and/or (ii) wherein at least one calendering roll is profiled to impress at least one pattern, in particular a plurality of core grooves, into an upper side and/or lower side of said core sheet, D) allowing the core sheet provided with the core grooves to solidify;

E) applying a decorative top structure, either directly or indirectly, onto the upper side of the core sheet, such that a decorative plate is formed; and F) cutting or sawing the decorative plate into a plurality of decorative panels, and G) machining the panel edges of each decorative panel, such that a first panel edge is provided with a first coupling profile, and a second panel edge is provided with a second coupling profile being designed to engage interlockingly with said first coupling profile of an adjacent panel, preferably both in horizontal direction and in vertical direction, and preferably such that a third panel edge is provided with a third coupling profile, and a fourth panel edge comprising a fourth coupling profile being designed to engage interlockingly with said third coupling profile of an adjacent panel, preferably both in horizontal direction and in vertical direction.

50. Method according to clause 49, wherein during step D) the extruded core is actively cooled down, preferably by means of cooling water.

51. Profiled calendering roll for use in a system according to one of clauses 47-48, and/or for use in a method according to one of clauses 49-50.

BRIEF DESCRIPTION OF THE DRAWINGS

The terms Fig., Figs., Figure, and Figures are used interchangeably to refer to the corresponding figures in the drawings.

The invention will be elucidated on the basis of non-limitative exemplary embodiments shown in the following figures. Herein show:

Figure 4A:
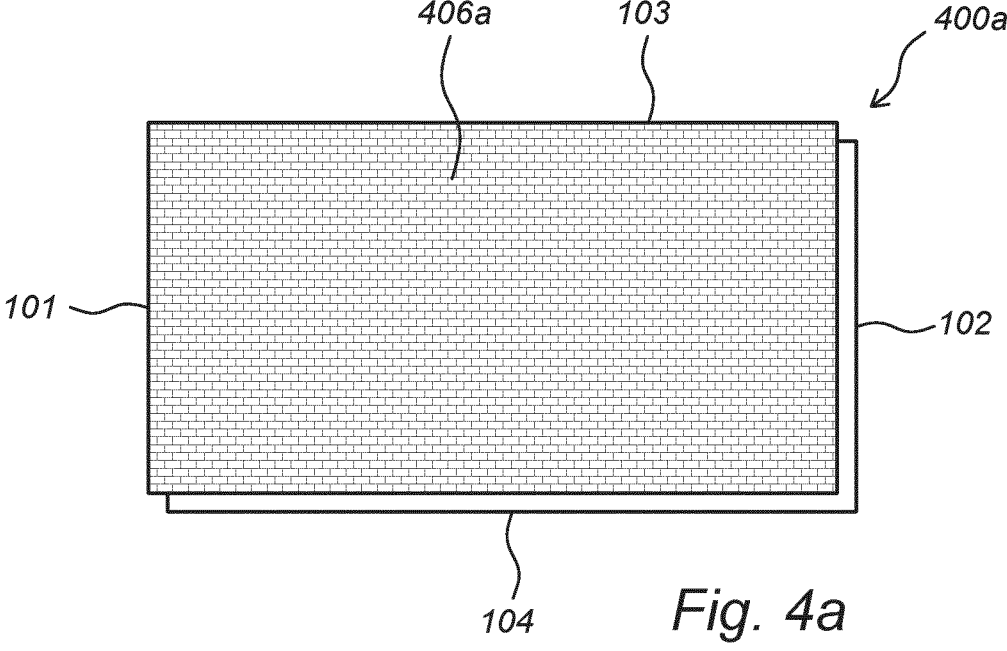
Figure 4B:
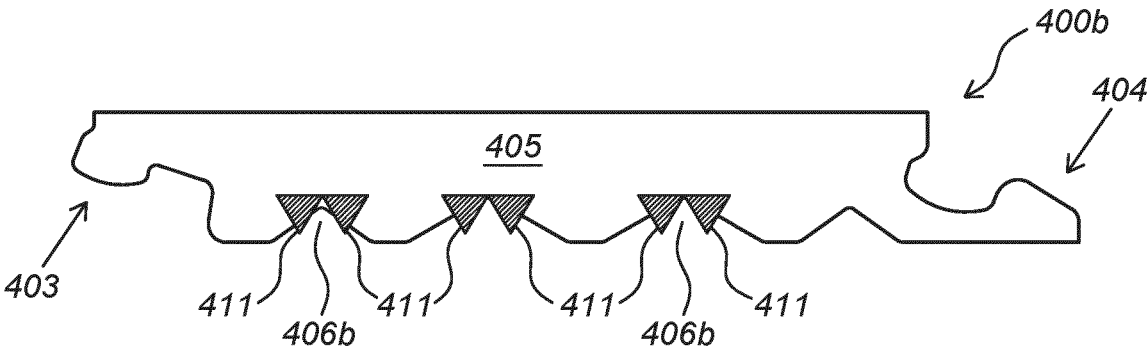
Figure 5A:
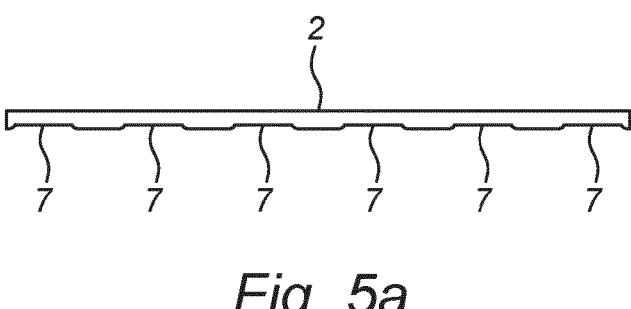
Figure 5B:
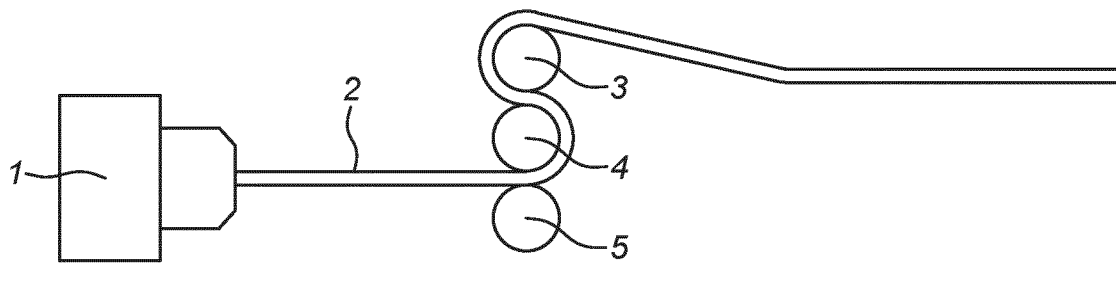
Figure 5C:
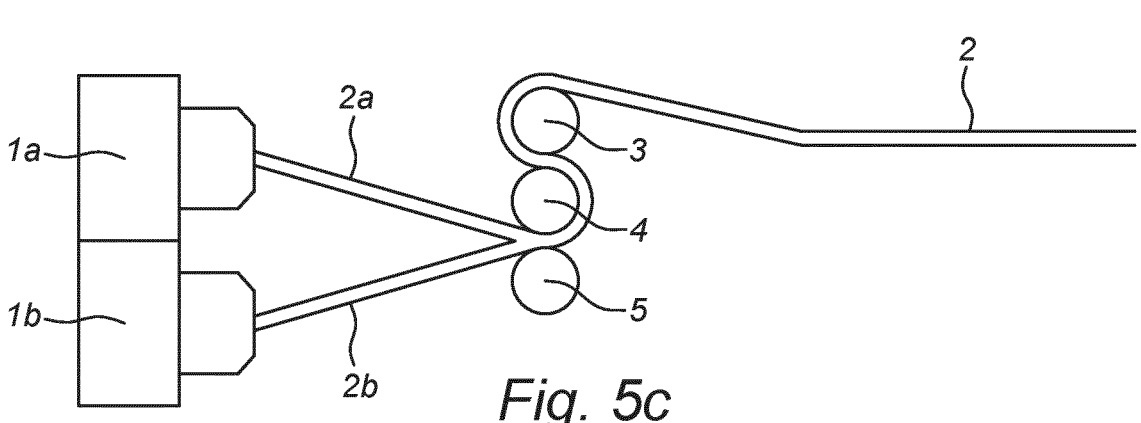
Figure 5D:
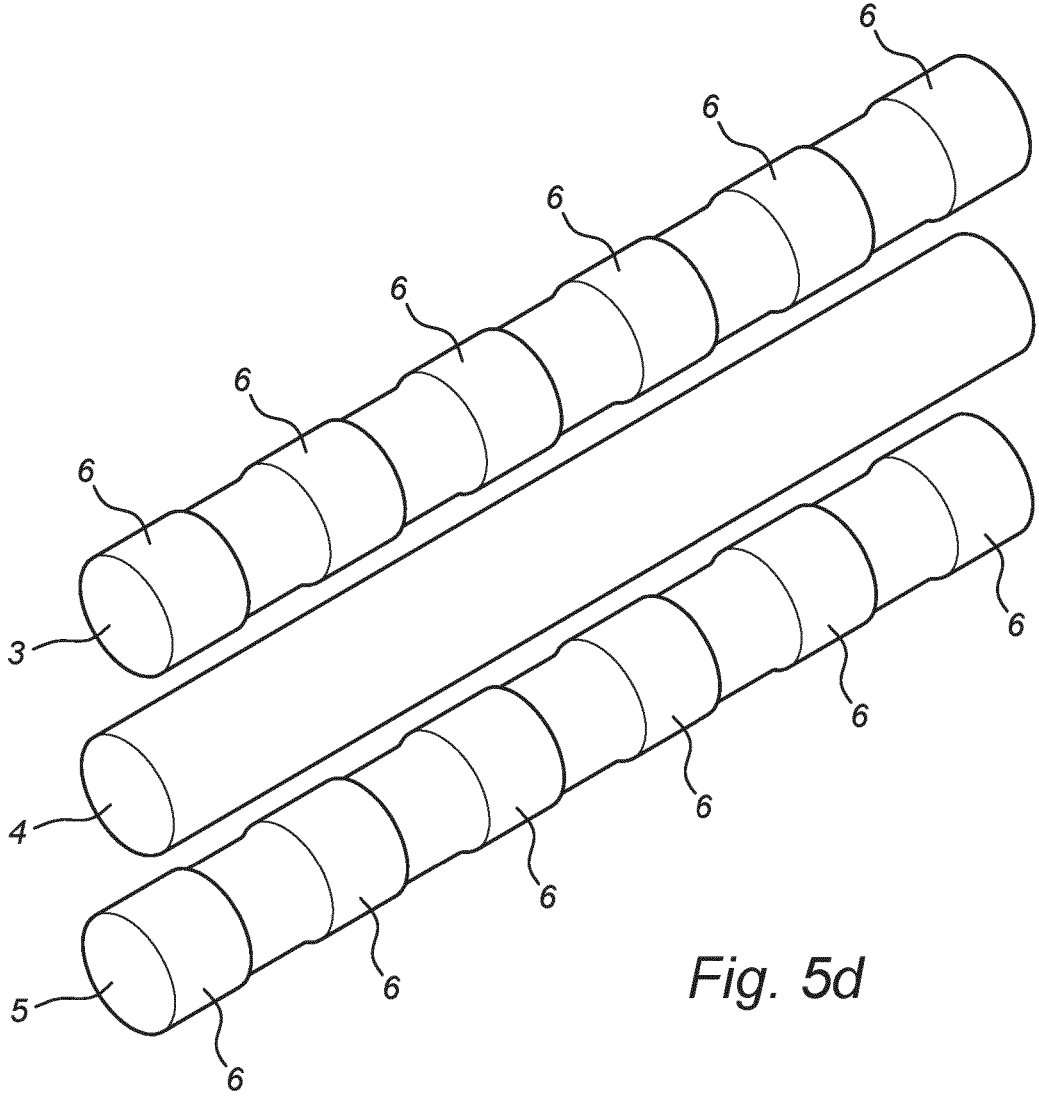
Figures 7A, 7B, 7C:
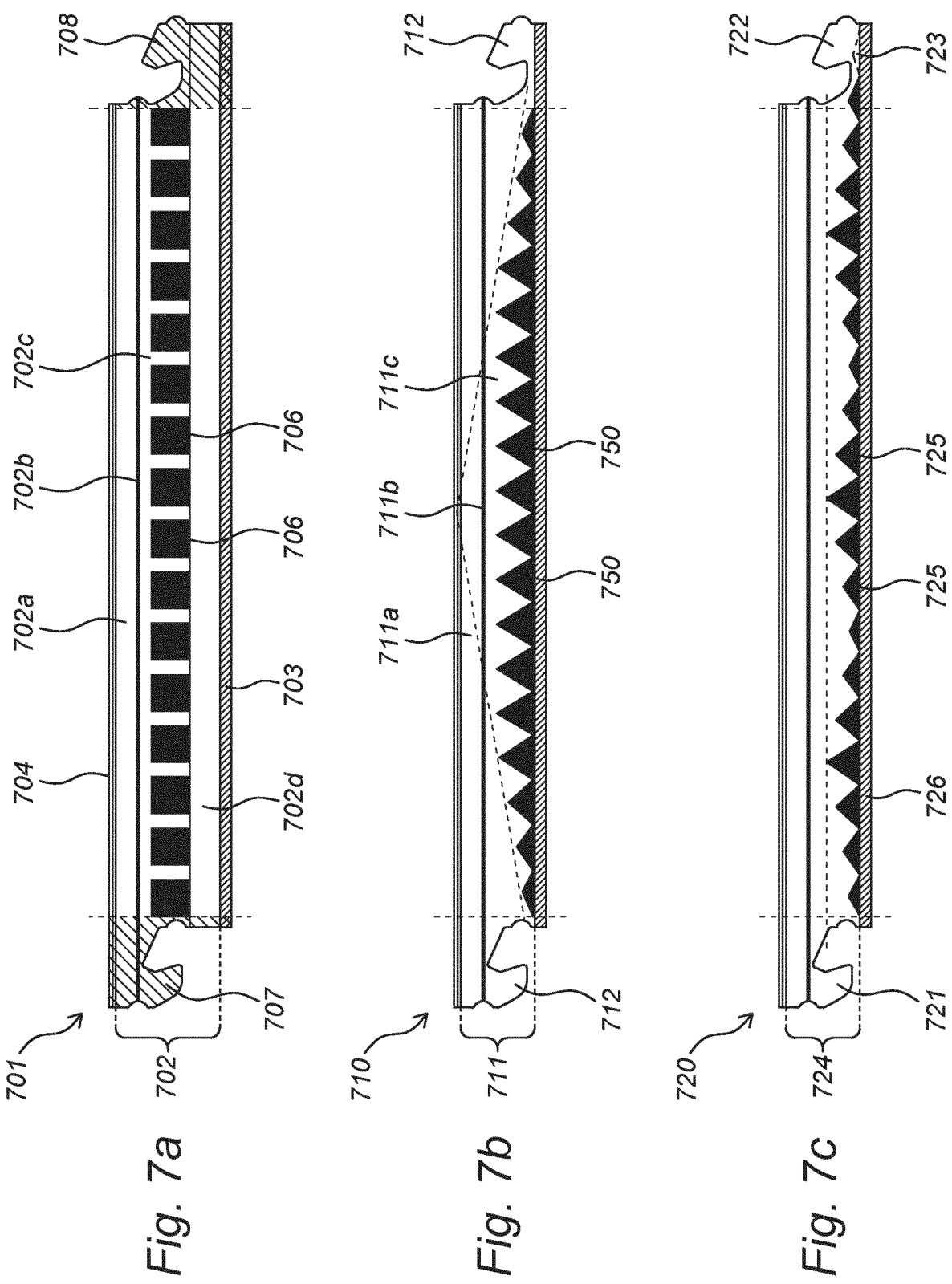
Figure 8:
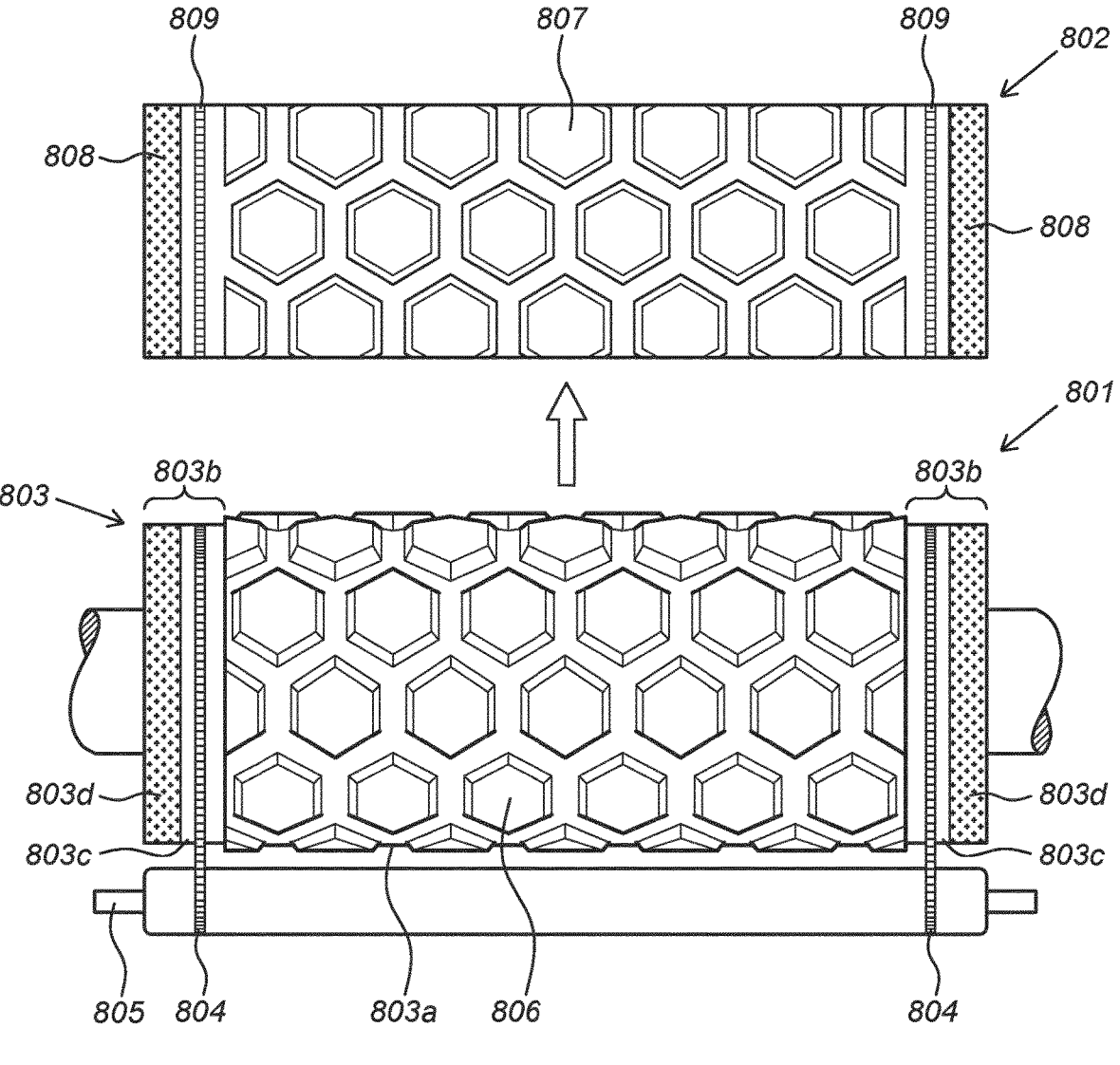
Figure 9:
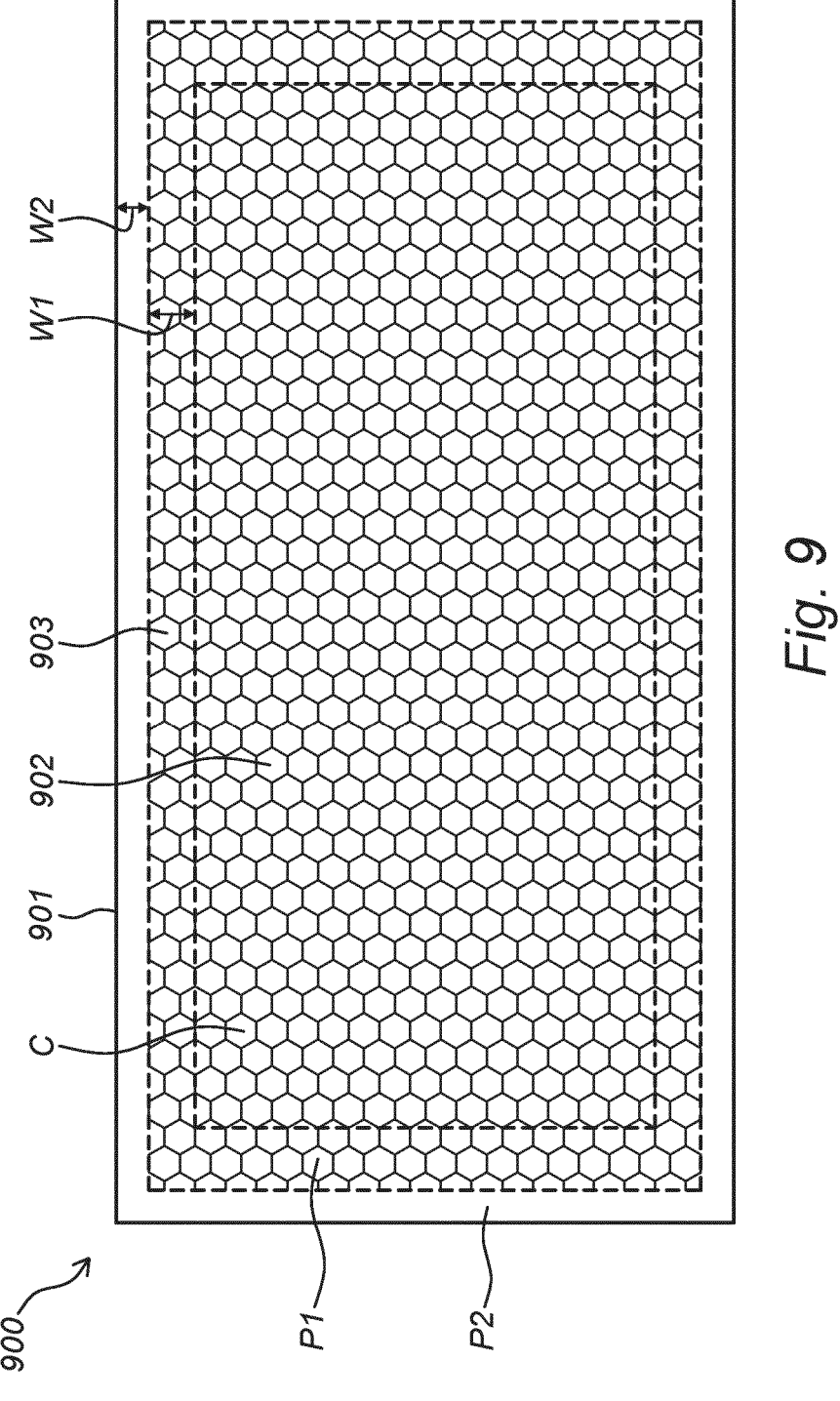

The invention will be elucidated on the basis of non-limitative exemplary embodiments shown in the following figures. Herein show:

FIGS. 1a-1e a top and bottom view of schematic representation of possible embodiments of decorative panels according to the present invention;

FIGS. 2a-2d a side view schematic representation of a cross section of possible embodiments of decorative panels according to the present invention;

FIGS. 3a-3d a side view schematic representation of a cross section of possible embodiments of decorative panels according to the present invention;

FIGS. 4a and 4b show schematic embodiments of different groove patterns according to the present invention;

FIG. 5a shows a schematic representation of a cross section of impressed material for forming a decorative panel according to the invention;

FIGS. 5b and 5c show different schematic embodiments of a part of a device for manufacturing a decorative panel according to the present invention;

FIG. 5d shows the calendering rolls which may be used in the device according to FIGS. 5b and 5c;

FIGS. 6a-6e show a bottom view of different panels according to the invention;

FIGS. 7a-7c show cross-sectional views of different panels according to the invention;

FIG. 8 shows a top view of a part of a production line for producing panels according to the invention, and a part of a panel produced by said production line;

FIG. 9 shows a bottom view of another panel according to the invention; and

Figure 10:
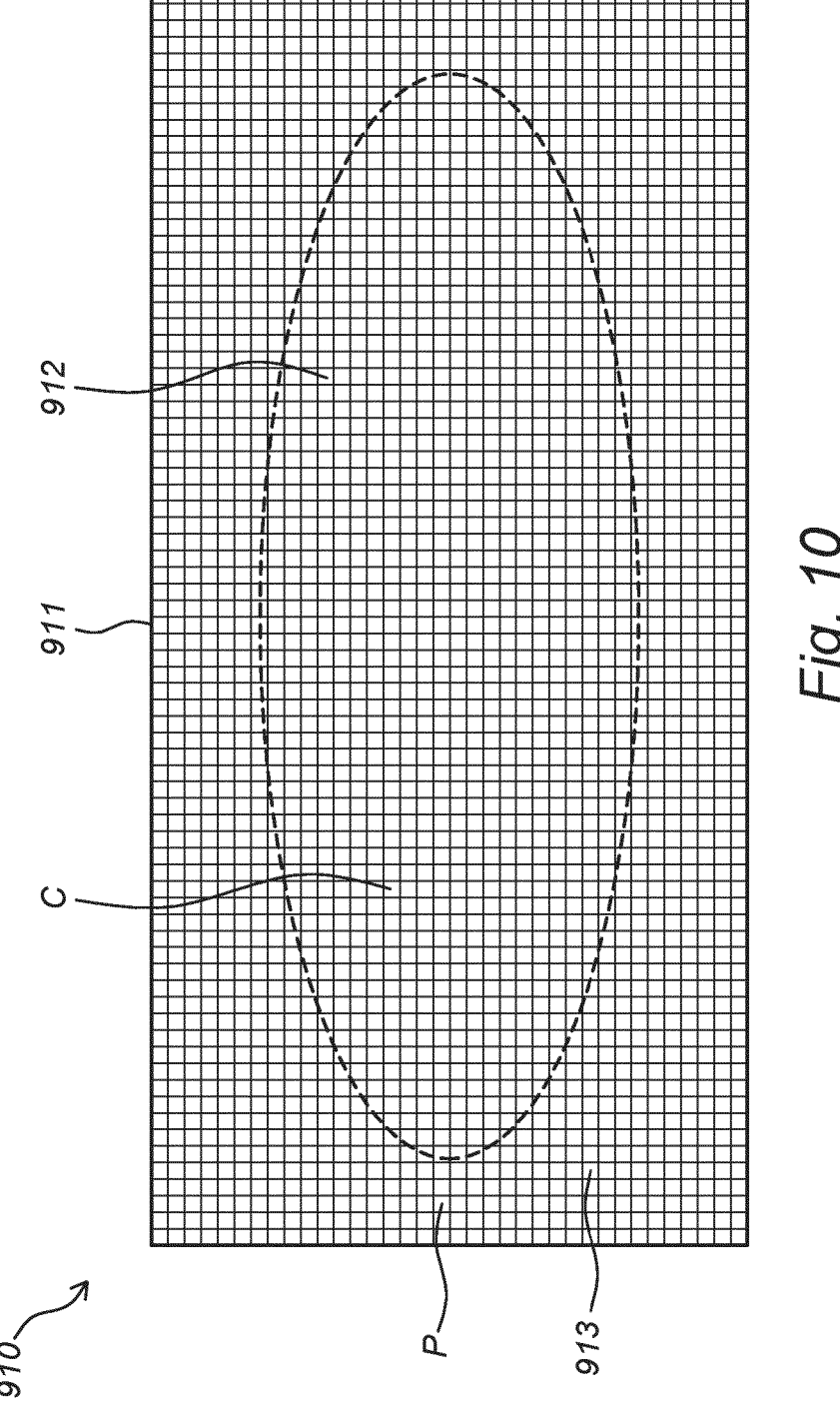

FIG. 10 shows a bottom view of yet another panel according to the invention

DESCRIPTION OF THE INVENTION

Within these figure, similar references refer to similar or equivalent features or elements.

Figures 1A, 1B, 1C, 1D, 1E:
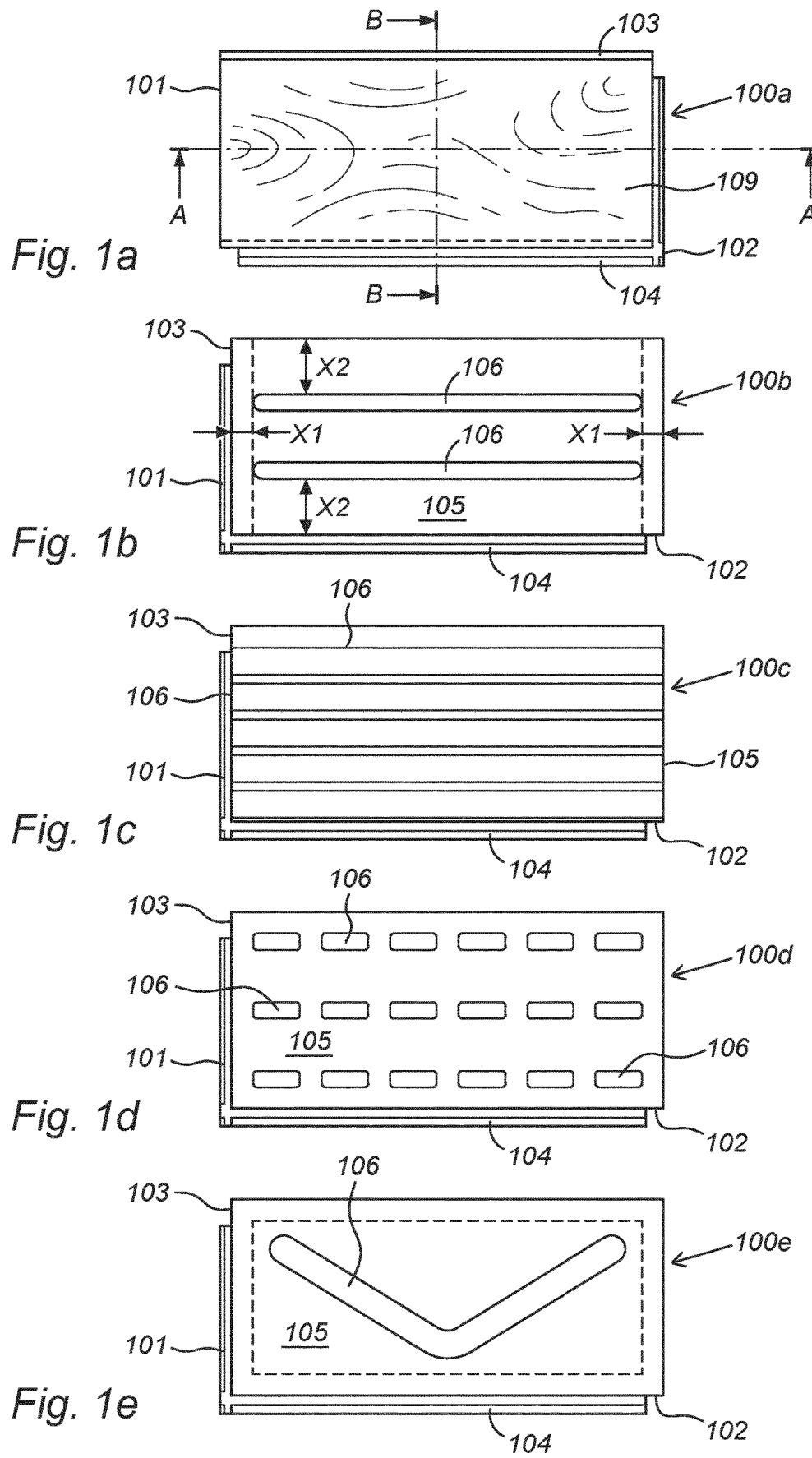

FIGS. 1a-1e show schematic representations of possible embodiments of decorative panels 100a-100e according to the present invention. The shown panels 100a-100e are rectangular and oblong in this example. In practice, the panels 100a-100e may have an alternative shape, such as square, hexagon, or octagonal. FIG. 1a shows a top view of the panel, which may be used for each of the panel embodiments shown in FIGS. 1b-1e. More in particular, FIGS. 1b-1e show a bottom view of different panels 100b-100e. Each panel 100a-100e comprises a core 105 comprising a first panel edge comprising a first coupling profile 101, and a second panel edge comprising a second coupling profile 102 being designed to engage interlockingly with said first coupling profile 101 of an adjacent panel, both in horizontal direction and in vertical direction. This first set of coupling profiles 101, 102 is positioned at opposite short edges of the panel 100a-100e. The coupling profiles 101, 102 are configured to be coupled by means of a fold-down movement and/or a vertical movement, and these coupling profiles 101, 102 are also referred to as "push-lock" coupling profiles as they can be pushed (and/or hammered) into each other. Each panel 100a-100e further comprises a third panel edge comprising a third coupling profile 103, and a fourth panel edge comprising a fourth coupling profile 104 being designed to engage interlockingly with said third coupling profile 103 of an adjacent panel, both in horizontal direction and in vertical direction. This second set of coupling profiles 103, 104 is positioned at opposite long edges of the panel 100a-100e. The coupling profiles 103, 104 are configured to be coupled by means of an angling-down movement and/or a rotational movement, and these coupling profiles 103, 104 are also referred to as "angling-down" coupling profiles. The push-lock coupling profiles 101, 102 and the angling-down coupling profiles 103, 104 may be identical to the coupling profiles 5, 6, 7, 8 as shown in FIGS. 1-3 of European patent EP3105392, the subject-matter of which European patent is incorporated in this document by reference. Each panel 100a-100e comprises a plurality core grooves provided in the lower side of the core 105, wherein each core groove 106 is defined by at least one groove wall. The groove wall makes (integral) part of the core 105. The core 105 is formed by means of an extrusion process, wherein the core grooves 106 may at least partially also be formed during this extrusion process. Subsequently, the core grooves 106 are given their final shape during calendering directly downstream of the extrusion process. Alternatively, the core grooves 106 are entirely made during calendering (rather than by means of extrusion). Still alternatively, the shape core grooves 106 is entirely determined by means of the extrusion process and the extruder used therein, wherein the subsequent calendering process preserves the shape of the core grooves 106 and does not affect or further deform the core grooves 106. During this calendering process, the core 105 is still of softened state and is to deform by means of rolling in between two (or more) facing, distant calendering rollers. The lower side of the core and the groove walls W of the core grooves could have substantially the same surface texture. The surface texture of the lower side of the core and the surface texture of the core grooves may mutually differ. FIG. 1a shows that the panel 100a comprises a decorative top structure 109, which is affixed, directly or indirectly, on an upper side of the core of the panel 100a. The decorative structure 109 shown is a non-limiting example of a decorative structure. Typically, the coupling profiles 101, 102, 103, 104 are realized by milling the laminated assembly of the core 105 and the affixed decorative structure 109.

FIGS. 1-b-1e shows different core groove configurations provided in the lower side of the core 105. As mentioned above the core grooves 106 are applied in the core by means of extrusion and/or calendering, preferably when the core is being discharged from an extruder, and hence is in a softened and/or molten state. This could be realised by an extruding device which may have an adjustable die and/or directly downstream the extruding device when the core is still sufficiently liquid (viscous or paste-like) and deformable to shape the core grooves 106. Alternatively or additionally one or more calendering rolls may be used to provide and/or preserve said grooves 106 (FIGS. 5b-5d), positioned downstream of the extruder, such that the viscous or paste-like extruded core passes through the calendering rolls to be (optionally) further shaped.

FIG. 1b shows that the core 105 is provided with two vertically extending core grooves 106 having a groove opening connected to the lower side of the core 105, wherein the entire part of the core grooves 106 is arranged inside the vertical planes respectively defined by all panel edges, such that the core grooves 106 do not intersect any coupling profile of the first coupling profile 101, the second coupling profile 102, the third coupling profile 103 and the fourth coupling profile 104. The core grooves 106 are positioned at a distance from all coupling profiles 101, 102, 103, 104, schematically indicated by reference signs X1, X2. This means that the core grooves 106 are provided, in this non-limitative embodiment, in a center portion of the core 105, and that a peripheral (edge) portion of the core 106, being provided with the coupling profiles 101, 102, 103, 104, is free of any core grooves 106. The result of this core grooves orientation is that the core 105 is a relatively light-weight core, wherein the core 105 may also have a limited thickness, for example between 2 and 10 mm, and wherein the coupling profiles 101, 102, 103, 104 are designed in a relatively robust manner, and can therefore operate in a relatively reliable and durable manner.

FIG. 1c shows a further possible structure of the core 105 of the panel 100c. The core 105 is provided with multiple (parallel) core grooves 106. All core grooves 106 are uninterrupted. The dimension of the core grooves 106 may be identical, though may also vary (on purpose) in practice. Contrary to the grooves 106 shown in FIG. 1b, the grooves 106 in FIG. 1c extend from one coupling profile 101, 102, 103, 104 of the panel 100c all the way to the other, preferably opposing, coupling profile 101, 102, 103, 104. Although the grooves 106 in FIG. 1c extend in the length direction of the panel 100c, it is also conceivable that the grooves 106 extend in the width direction.

FIG. 1d show structure of the core 105 of a panel 100d wherein the core comprises multiple discontinuous core grooves 106. FIG. 1e shows a structure of the core 105 of a panel 100e wherein the core comprises one core groove 106. The core groove 106 has, in the depicted bottom view, a V-shape over the length of the panel 100e. This particular structure of the groove 106 may be provided by providing the calendering rolls with a negative or positive impressing structure, and hence is profiled. Such an impressing structure of the calendering rolls may be in accordance with a rolling speed and/or diameter of said rolls, such as to provide the desired type of groove 106. Hence, different shapes of the core grooves 106 can be provided.

FIGS. 2a-2d show a schematic representation of a cross section of a decorative panel 200a-200d according to the present invention. The cross section shown in these FIGS. 2a-2d could, for example, be the cross section of the panel according to line A-A shown as in FIG. 1a. Hence, in FIGS. 2a-2d the push-lock profiles of the panel are shown.

Figures 2A, 2B, 2C, 2D:
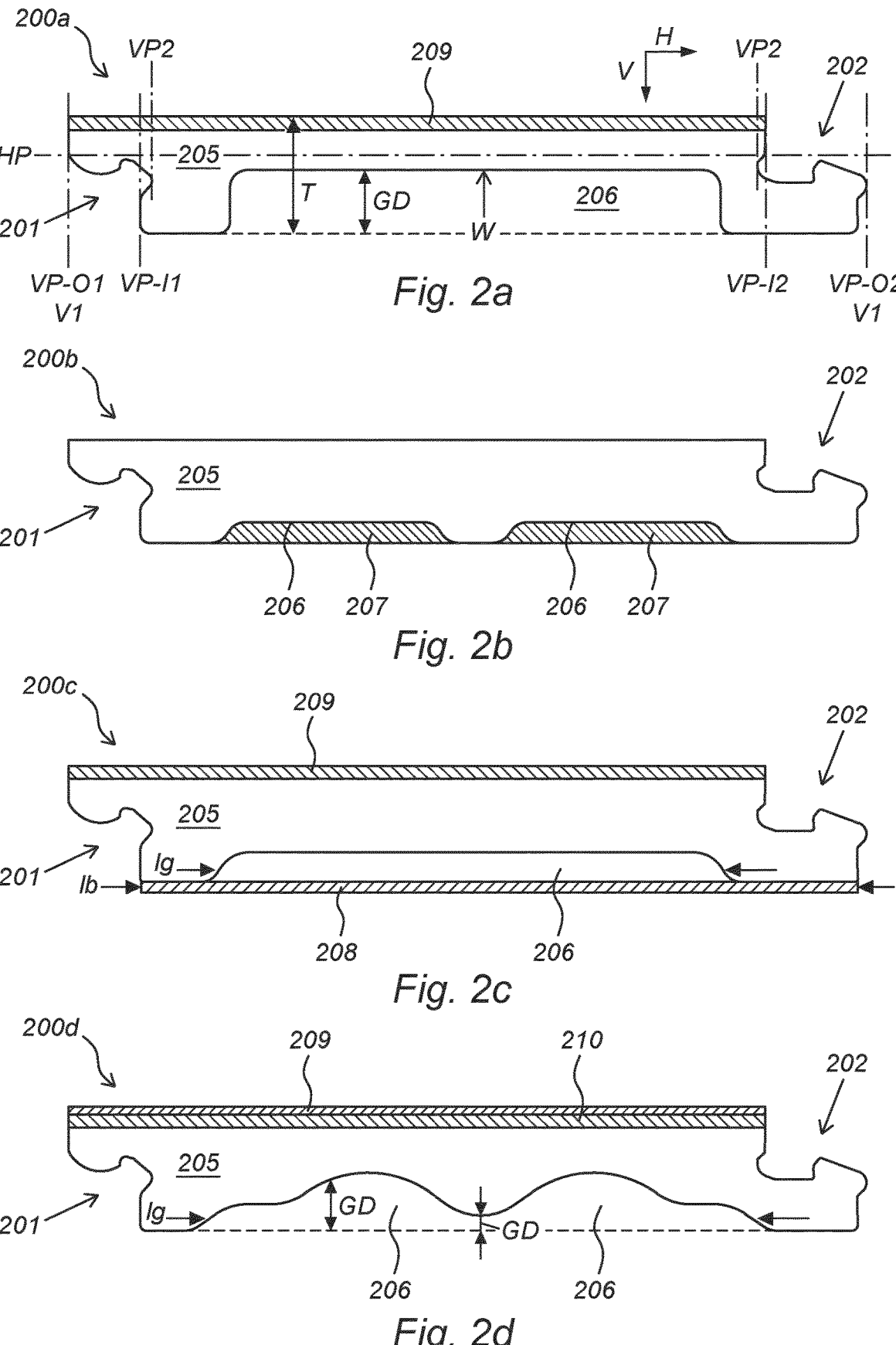

The figures show the first panel edge comprising a first coupling profile 201, and a second panel edge comprising a second coupling profile 202 which are designed to engage interlockingly with said first coupling profile 201 of an adjacent panel. The cross section shown is typically the so-called long-side of the panel 200a-200d. Each panel 200a-200d comprises a core 205 which is provided with core groove(s) 206. Each panel 200a-200d defines a horizontal plane (HP) being parallel to the core 205 of the panel, which is only visualized in FIG. 2a. Each coupling profile 201, 202 defines two vertical planes (VP), and more in particular the first coupling profile 201 defines a vertical outer plane (VP-O1), which coincides with a top outer edge of the first coupling profile 201, and also defines a vertical inner plane (VP-I1), which coincides with a bottom outer edge of the first coupling profile 201. The second coupling profile 202 defines a vertical outer plane (VP-O2), which coincides with a bottom outer edge of the second coupling profile 202, and also defines a vertical inner plane (VP-I2), which coincides with a top outer edge of the second coupling profile 202. In coupled condition of two panels 200a, VP-O1 of a first panel will coincide with VP-I2 of a second panel and VP-I1 of said first panel will coincide with VP-O2 of said second panel. As mentioned in the above description, the outer edges (VP-O1, VP-O2) of the panel 200a are often also referred to a vertical plane V1. Additional vertical planes (VP2) can be identified which coincide with a part of a coupling profiles 201, 202, positioned closest to a centre portion of the core of the panel 200a. As can be seen, the core groove(s) 206 is/are positioned at a distance from each of the aforementioned vertical planes (VP-O1, VP-I1, VP-I2, VP-O2, VP1, VP2). The vertical planes are only visualized in FIG. 2a for clarity reasons, but are obviously also present in the further FIGS. 2b-2d. As can be seen in the FIGS. 2a-2c, the core grooves 206 are preferably located at a distance of all vertical planes defined above. It is, however, possible, as shown in FIG. 2d that the core grooves 206 are positioned at a distance of at least one vertical plane of each coupling profile 201, 202. Although not depicted in FIGS. 2a-2d, the groove(s) 206 may alternatively also extend to or through said vertical planes (VP-O1, VP-I1, VP-I2, VP-O2, VP1, VP2). And hence, as such the groove(s) 206 may extend all the way over the bottom side of the panel 200a-200d.

The panel 200a shown in FIG. 2a comprises a decorative top structure 209. The panel 200a shows a relatively long and deep core groove 206 which almost extends over the entire length of the panel 200a. In this particular embodiment, the core groove 206 starts at a predetermined distance from the panel edges such that the core grooves 206 do not intersect with the first coupling profile 101 and the second coupling profile 102. The core groove depth (GD) of the core groove 206 is more than 0.3 times the panel thickness (T). However, when a thinner groove 206 with a lower groove depth (GD) is applied, it may stretch essentially entirely to the first and second coupling profile 101, 102, without interfering therewith. The lower side of the core and the groove walls of the core grooves 206 have a substantially smooth surface texture.

FIG. 2b shows a panel 200b comprising an interrupted, discontinuous core groove 206. This may enhance the stability of the panel 200b, for example when the panel is exposed to heavy loads. The core grooves 206 are filled with a material 207, in particular a sound-dampening material 207. The decorative top structure (not shown) is printed directly on top of the core 205 of the panel 200b.

FIG. 2c shows a further embodiment of a panel 200c according to the present invention. The core groove 206 is shielded by a backing layer 208 which is affixed to the lower side of the core 205. It can be seen that the length Ig of the core groove 206 is smaller than the length lb of said backing layer 208. Hence, the backing layer 208 substantially fully covers the core groove 206. However, as discussed above, it is alternatively also conceivable the groove 206 stretches substantially the entire length lb of the core 205. It can be seen that the width of the groove opening of the core groove 206 is larger than the width of an inner part of said core groove. The core grooves 206 are air-filled. It is however also conceivable that the core grooves 206 are filled with any suitable filling material. The panel 200c further comprises a decorative top layer 209.

FIG. 2d shows another possible embodiment of a panel 200d according to the present invention. The panel comprises a core groove 206 wherein the core groove depth (GD) varies along the core groove length Ig. The core groove 206 is, in this particular embodiment, in particular defined by two terminal portions enclosing a centre portion. The groove 206 may however stretch over the entire length of the core 205. The panel 200d further comprises a reinforcement layer 210 and a decorative top layer 209.

FIGS. 3a-3d show a schematic representation of a cross section of a decorative panel 300a-300d according to the present invention. The cross section shown in these FIGS. 3a-3d could, for example, be the cross section of the panel according to line B-B shown as in FIG. 1a. Hence, in FIGS. 3a-3d the angling down profiles of the panel are shown.

Each panel 300a-300d comprises a core 305 which is provided with core groove(s) 306. Each panel 300a-300d again defines a horizontal plane (HP) being parallel to the core 205 of the panel, which is only visualized in FIG. 3a, which could be the same horizontal plane (HP) as shown in FIG. 2a. Each coupling profile 301, 302 defines two vertical planes (VP), and more in particular the third coupling profile 301 defines a vertical outer plane (VP-O3), which coincides with a top outer edge of the third coupling profile 301, and also defines a vertical inner plane (VP-I3), which coincides with a bottom outer edge of the third coupling profile 301. The fourth coupling profile 302 defines a vertical outer plane (VP-O4), which coincides with a bottom outer edge of the fourth coupling profile 302, and which also defines a vertical inner plane (VP-I4), which coincides with a top outer edge of the fourth coupling profile 302. In coupled condition of two panels 300a, VP-O3 of a first panel will coincide with VP-I4 of a second panel and VP-I3 of said first panel will coincide with VP-O4 of said second panel. As mentioned in the above description, the outer edges (VP-O3, VP-O4) of the panel 300a are often also referred to a vertical plane V1. Additional vertical planes (VP2) can be identified which coincide with a part of a coupling profiles 303, 304 positioned closest to a centre portion of the core of the panel 300a. As can be seen, the core groove(s) 306 in this non-limitative embodiment is/are positioned at a distance from each of the aforementioned vertical planes (VP-O3, VP-I3, VP-I4, VP-O4, VP1, VP2). It may however be conceivable that at least one vertical plate VP-O3, VP-I3, VP-I4, VP-O4, VP1, VP2, in particular planes VP2, VP-I3, VP-I4, and/or VP-O4 intersect with at least one groove 306. That is, the groove(s) 306 do not necessarily have to lie within the width of the panel 3001-300d. The vertical planes are only visualized in FIG. 3a for clarity reasons, but could obviously be defined in the further FIGS. 3b-3d. As can be seen in the FIGS. 3a-3d, the core grooves 306 are in these non-limitative embodiments located at a distance of all vertical planes defined above. It is, however, possible that the core grooves 306 are positioned such that at least one groove intersects with at least one vertical plane of each coupling profile 301, 302, which alternative embodiment is not shown in FIGS. 3a-3d.

Figures 3A, 3B, 3C, 3D:
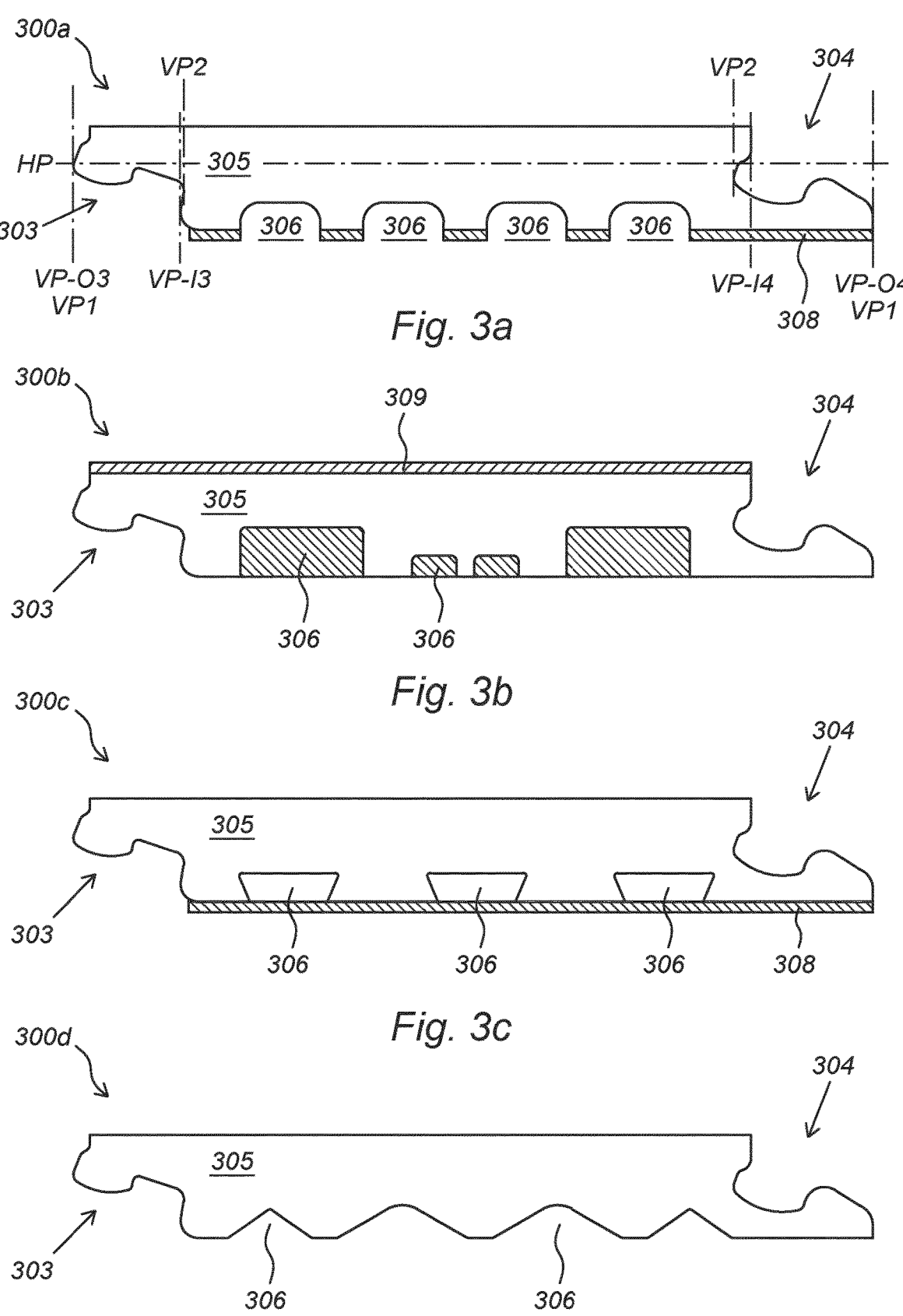

FIG. 3a shows that the panel 300a comprises multiple core grooves 306 having a substantially equal width. The panel 300a comprises a backing layer 308 which is configured such that the core grooves 306 are not covered by the backing layer 308.

FIG. 3b shows a panel 300b comprising core grooves 306 wherein the outer core grooves 306 have a larger depth than the inner core grooves 306. Each groove core 306 is filled with a (sound- and/or impact dampening) material. The panel 300b further comprises a decorative top layer 309.

The panel 300c shown in FIG. 300c comprises core grooves 306 wherein the width of the opening of the core groove 306 is smaller than the width of a further, inner part of the core groove 306. The backing layer 308 substantially fully covers the core grooves 306. The core grooves 306 are air-filled.

FIG. 3d shows a panel 300d comprising core grooves 306 wherein the width of the opening of the core groove 306 is larger than the width of an inner part of said core groove 306.

FIG. 4a depicts a bottom surface of a panel 400a provided with a groove pattern 406 according to an embodiment of the present invention. By means of calendering rolls (FIG. 5d), the groove pattern 406a is applied to and/or preserved at the bottom side of the panel 400a. The repetitive groove pattern 406a may be realised by means of an impressing structure provided on one of the calendering rolls 3, 4, 5. By feeding the partially viscous or paste-like core material 2, 2a, 2b from the extruder 1 into calendering rolls 3, 4, 5, it may be possible to provide a multitude of diverse and complex groove patterns 406*a*, 406*b* into the core of the panel 400*a*, 400*b*. Besides groove patterns it is also conceivable to provide a decorative impression on the bottom surface of a panel, such as a logo or text. FIG. 4*b* shows a second example of a groove pattern 406*b* applied to the underside of the core 405 of the panel 400*b*. The groove pattern 406*b* of the panel 400*b* in FIG. 4*b* is more complex. Also the more complex groove patterns 406*b* may be more easily achieved by means of calendering. The groove pattern 406*b* comprises a plurality of triangularly shaped protrusions 411 in each of the grooves 406*b*. Such triangularly shaped protrusions 411 may be beneficial for specific properties of the panel 400*b*. For example, through said additional triangularly shaped protrusions 411 the panel 400*b* may exhibit better sound absorbing qualities. Alternatively, said triangularly shaped protrusions 411 may yield a bigger surface area on the bottom of the panel 400*b*, which may be of benefit in case the panels are to be affixed to a ground surface by means of an adhesive. Moreover, by means of calendering it is conceivable that the underside of a panel 400*a*, 400*b*, may be provided with a specific decorative imprint, such as a brand or logo.

FIG. 5*a* depicts a schematic representation of an extruder 1, in particular a discharge portion 1 thereof. As shown in this non-limitative embodiment, the discharge portion 1 of the extruder 1 is provided with a plurality of grooves 7. Although it is optional to provide grooves 7 in the extruder discharge portion 1, it may be beneficial to do so. These grooves 7 may pre-shape the slab 2 of viscous or paste-like core material 2, which allows the calendering rolls 3, 4, 5 to make a further bigger contribution, or to provide further details to the grooves 7. The calendering rolls 3, 4, 5 may deepen the already present grooves 7 provided by the extruder 1, and additionally provide for detailed structures, such as the triangularly shaped protrusions as shown before. This may be achieved by providing the calendering rolls 3, 4, 5 with a negative relief of the final desired cross sectional shape of the grooves in the slab of core material 2.

FIG. 5*b* shows an extruder 1 and a set of calendering rolls 3, 4, 5, used for preparing a panel according to the present invention. The slab of viscous or paste-like core material 2 is discharged from the schematically depicted extruder 1, and may at that stage already been provided with core grooves at the upper side and/or lower side of the core material. Subsequently, the core is fed into the calendering rolls 3, 4, 5, wherein the core grooves are preserved and/or formed and/or further deformed. In this non-limitative example three calendering rolls 3, 4, 5 are used for impressing the desired shape of grooves, however any arbitrary number or calendering rolls 3, 4, 5 may be used in this respect. Preferably, one of the calendering rolls 3, 4, 5 is a driven roll, for example driven by an electric motor. The other rolls may rotate about an axis that is preferably parallel to the axis of rotation of the driven roller. The non-driven rollers may rotate about said axis of rotation as the slab of core material 2 is being pushed through the calendering rolls 3, 4, 5 by the driven roller. It may be conceivable that only a single calendering roll is provided with an impressing structure. That is, the slab of core material 2 is forced through for example two calendering rolls, wherein a predetermined nip pressure causes the impressing structure to be pressed into the slab of material 2. It is also conceivable that a plurality of consecutive calendering rolls 3, 4, 5 are provided with an impressing structure. These impressing structure provided onto said consecutive calendering rolls 3, 4, 5 may for example deviate slightly from one another, such that the groove pattern is pressed into the slab of core material 2 in subsequent steps. In the latter example it is preferred the multiple impressing structures are mutually coordinated with the diameter thereof, and/or the speed of the slab of material 2. FIG. 5*c* shows a different embodiment, wherein two extruders 1*a*, 1*b* are provided for, which allows co-extrusion of two sublayers 2*a*, 2*b*, of the core 2. This may provide more flexibility in terms of the manufacturing process. One of the slabs of core material 2*a*, 2*b* may for example be of a softer, more workable type of material, which is preferably forming the bottom of the panel. As such the groove pattern may be more easily impressed into said softer material 2*a*, 2*b* during extrusion and/or calendering. The two separately discharged slabs of core material 2*a*, 2*b* may be mutually adhered by passing through a first set of calendering rolls 3, 4, 5. The nip pressure may mutually adhere the two slabs of core material 2*a*, 2*b* together. Additionally, it may be conceivable that one of said first calendering rolls 3, 4, 5 is provided with an impressing structure, such that a groove pattern is pressed into one of the slabs of core material 2*a*, 2*b*, preferably the slab of material 2*b* forming the bottom side of the panel.

FIG. 5*d* shows a detailed schematic of the calendering rolls 3, 4, 5 which may be used in the process of manufacturing the panel according to the invention. In this particular figure two calendering rolls 3, 5 are provided with a predetermined impressing structure, such as to form a predetermined groove in the core. This impressing structure is in this non-limitative embodiment formed by a plurality of groove shaped protrusions 6, which are pressed into the slab of material 2, 2*a*, 2*b*, such as to form the grooves. The middle calendering roll 4 has a substantially smooth surface. The slab of viscous or paste-like core material 2, 2*a*, 2*b* discharged from the extruder 1, 1*a*, 1*b* passes through a first outer calendering roller 5 and the middle calendering roller 4, such that the predetermined impressing structure 6 forms the predetermined grooves in the core. The core material then backwardly bends over the driven middle roller 4 such that is passes through the middle roller 4 and the upper roller 3, wherein the side of the core which is already provided with the grooves faces towards the upper calendering roll 3, which is also provided with a similar impressing structure 6. This further shapes the grooves in the core to have their final shape, which may be hardened of cured. Where with respect to this figure the wording lower, middle, or upper calendering roll is used, the invention is not limited thereto. The order of the calendering rolls 3, 4, 5 or the manner wherein core material 2, 2*a*, 2*b* flows therethrough may be changed arbitrarily.

FIGS. 6*a*-6*e* each show a bottom view of a different decorative panel 601, 602, 603, 604, 605 according to the invention. Although oblong rectangular panels 601, 602, 603, 604, 605 are shown, otherwise shaped panels, like triangular panels, square panels, hexagonal panels, parallelogrammatic panels, in particular diamond shaped panels may be used. Each panel 601, 602, 603, 604, 605 comprises a core 606, 607, 608, 609, 610 of which a rear side is shown in FIGS. 6*a*-6*d*. On top of said core, not visible in the figures, a decorative top structure is applied.

The panel 601 shown in FIG. 6*a* comprises an impressed pattern 611 located only at a center portion 612 of the rear side of the core 606, wherein a circumferential edge portion 613 surrounding said center portion 612 is free of impressions (cavities). This allows the edge portion 613 to be profiled at two or four panel edges without additionally weakening these edges by impressions, which will be in favour of the locking strength of interconnected panels. The impressed pattern 611 constitutes a honeycomb pattern defined by hexagonally shaped cavities (as seen from a bottom view) which are spaced by a grid (network) of cavity walls. Preferably, the shortest distance between opposite cavity walls is approximately 10 mm. Preferably, the wall thickness (width of the wall) is approximately 2.6-3.0 mm. The depth of each cavity is preferably situated in between 1.4 and 1.8 mm. Preferably, a bottom wall 611*a* of the cavities is polyhedrally shaped, in particular hexagonal pyramid shaped. The cavities can be applied e.g. by means of calendering, in particular (im)pressing and/or rolling, and/or by means of etching, and/or by means of mechanically removing core material. This also applies to the embodiments described hereinafter.

The panel 602 shown in FIG. 6*b* looks quite similar to the previous panel, and comprises a first relatively deep impressed (honeycomb) pattern 612 located at a center portion 613 of the rear side of the core 607 and extending from a short panel side to the opposite short panel side. The first impressed pattern 612 is located at a distance from the opposite long panel edges, leaving two longitudinal strips which each are provided with a second, less deep impressed pattern 650, more in particular a shallow texture. This second impressed pattern still contributes to the acoustic properties of the panel, and—to some extent—to material saving of the core, and typically contributes to the anti-slip properties of (the rear side) of the panel.

Figure 6C:
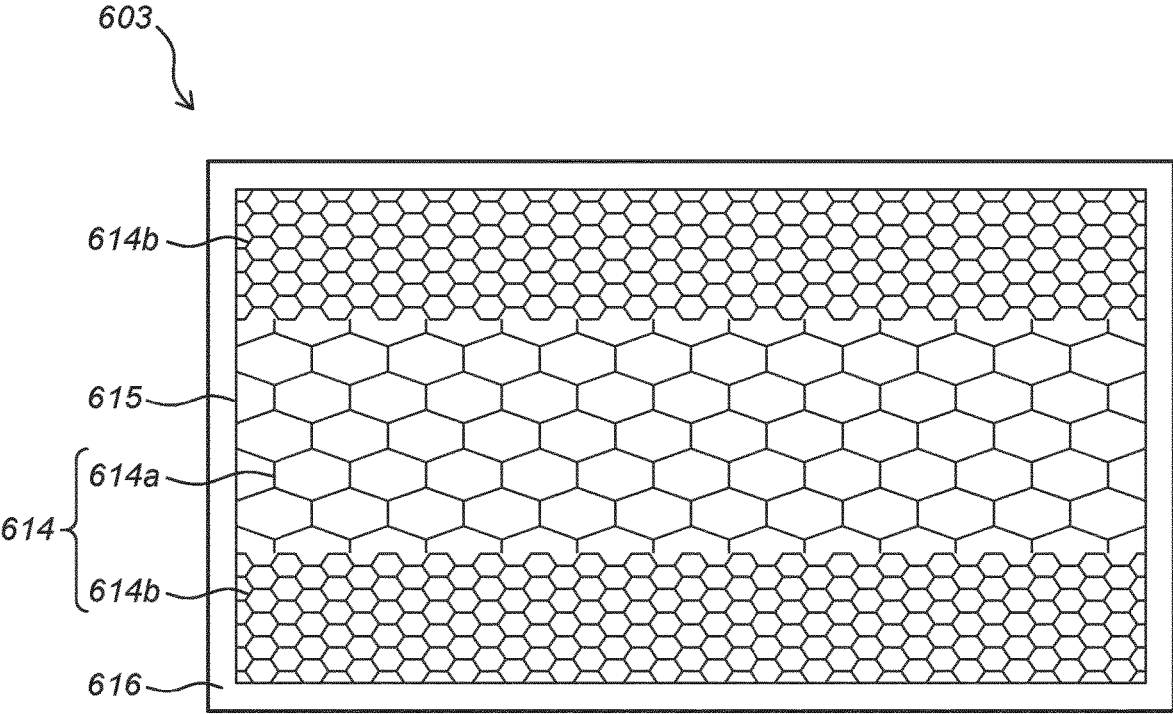

The panel 603 shown in FIG. 6*c* looks quite similar to the panel shown in FIG. 6*a*, and comprises an impressed pattern 614 located only at a center portion 615 of the rear side of the core 608, wherein a circumferential edge portion 616 surrounding said center portion 615 is free of impressions (cavities). The impressed pattern 614 is composed of two sub patterns 614*a*, 614*b*, more in particular a first sub pattern 614*a* provided with a relatively deep and/or coarse honeycomb pattern, wherein said first sub pattern 614 is enclosed in between second sub patterns 614*b* provided with a less deep and/or finer honeycomb pattern. It is also imaginable that the pattern 614 is a single pattern comprising cavities with a decreasing depth towards at least one pair of opposite panel edges.

Figure 6D:
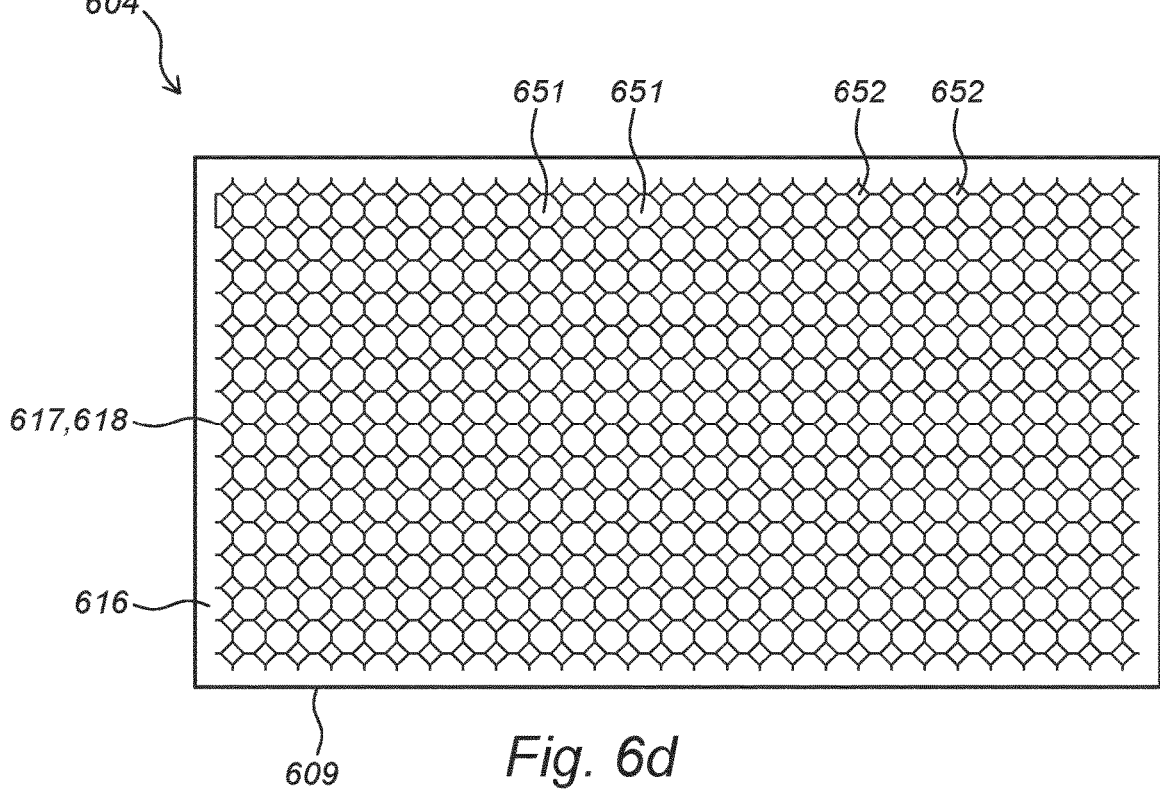

The panel 604 shown in FIG. 6*d* comprises an impressed pattern 617 located only at a center portion 618 of the rear side of the core 609, wherein a circumferential edge portion 619 surrounding said center portion 618 is free of impressions (cavities). This allows the edge portion 619 to be profiled at two or four panel edges without additionally weakening these edges by impressions, which will be in favour of the locking strength of interconnected panels. The impressed pattern 617 constitutes a octagon pattern defined by an assembly of octagonally shaped cavities 651 (as seen from a bottom view), enclosing square or diamond shaped cavities 652, wherein the cavities are spaced by a grid (network) of cavity walls.

Figure 6E:
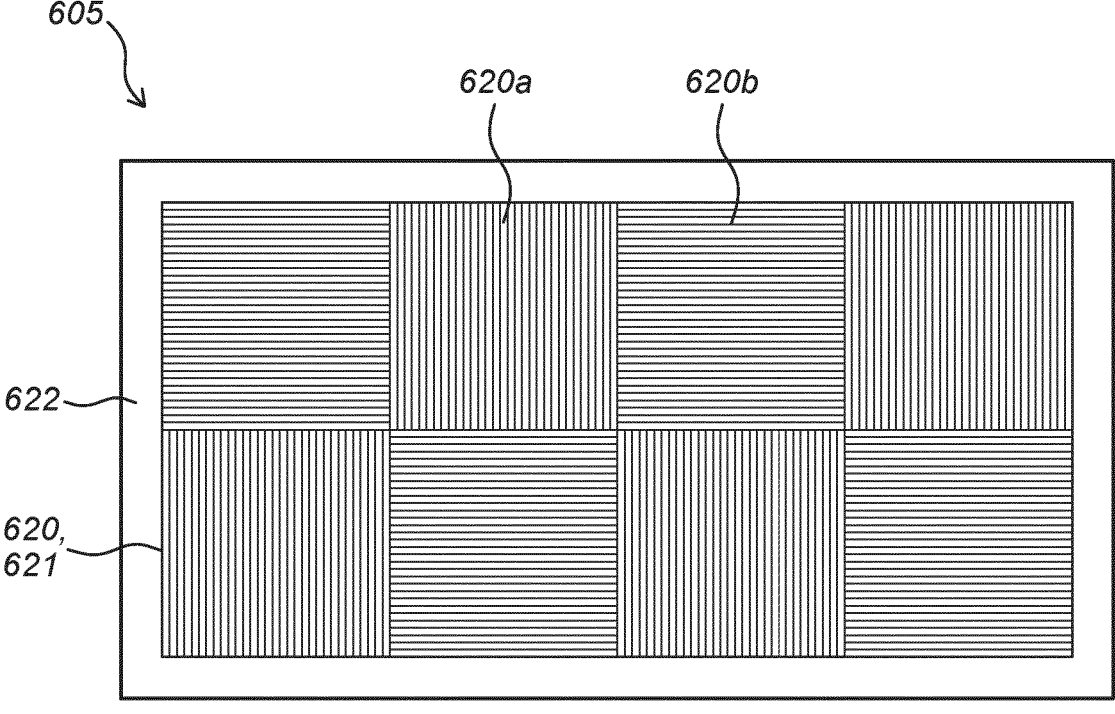

The panel 605 shown in FIG. 6*e* comprises an impressed pattern 620 located only at a center portion 621 of the rear side of the core 610, wherein a circumferential edge portion 622 surrounding said center portion 621 is free of impressions (cavities). The impressed pattern 620 is composed of at least two sub patterns 620*a*, 620*b*, more in particular a plurality of first sub patterns 620*a* provided with a plurality of parallel oriented elongated grooves 623 (channels or slots), and a plurality of second sub patterns 620*b* provided with a plurality of parallel oriented elongated grooves 624 (channels or slots), wherein the first patterns 620*a* and second patterns 620*b* are oriented alternately, and wherein the grooves 623 of the first sub pattern 620*a* extend in transverse direction of the panel, while the grooves 624 of the second sub pattern 620*b* extend in longitudinal direction of the panel. This alternate configuration of sub patterns 620*a*, 602*b* leads to an improved rigidity (stiffness) of the panel, and typically also to improved sound dampening properties.

Obviously, many variations in shapes, orientations, dimensions are conceivable in the patterns disclosed in FIGS. 6*a*-6*e*.

FIG. 7*a* shows a cross-sectional view of a decorative panel 701 according to the invention. The panel 701 comprises a core 702, which is composed of a plurality of core layers 702*a*, 702*b*, 702*c*, 702*d*, at least one backing layer 703 attached to a rear side of the core 702 and a decorative top structure 704. The decorative top structure 704 comprises a plurality of layers, such as a preferred white primer layer, a digitally printed decorative layer on top of said primer layer (if applied), at least one wear layer, preferably provided with a texture, such as an embossing, preferably aligned with the decorative layer, and optionally at least one top coating. For sake of clarity these layers of the decorative top structure 704 are not individually shown in this figure. As indicated above, the core 702 is composed of four layers, wherein an upper core layer 702*a* and a lower core layer 702*d* are non-impressed relatively rigid (hard) layers, which enclose a compressible and/or flexible layer 702*b*, and a relatively rigid (hard) patterned layer 702*c*. The patterned layer 702*c* comprises a plurality of elongated grooves 706 or channels which may connect or may not connect to two opposing panel edges. The channels are at least partially covered by the lower core layer 702*d*. This leads to enclosed channel-shaped air pockets to save material and/or to absorb acoustic energy. The grooves 706 are not located at the at least two opposing edges as shown in this figure in order to be able to profile these edges with complementary coupling profiles 707, 708, to allow the panel 701 to be interconnected with another panel, preferably such that the panels 701 are locked both in horizontal direction and vertical direction. Suitable materials for each layer have been described in the description part above.

The panel 710 shown in FIG. 7*b* is substantially identical to the panel 701 shown in FIG. 7*a*, with the main difference that a core 711 is composed of three core layers 711*a*, 711*b*, 711*c* (instead of four core layers). An upper core layer 711*a* is a relatively rigid (hard) polymer based layer with a uniform thickness which is preferably situated in between 1.5 and 2 mm. A lower core layer 711*c* is (also) a relatively rigid (hard) polymer based layer which is provided with an impressed patterns composed of cavities 750, such as recesses, slots, or grooves, optionally elongated grooves, wherein the cavities exhibit a decreasing cavity depth towards at least two opposing panel edges, which opposing panel edges as such are free of any impressed cavities to maintain more core material at the edges to create coupling profiles 712 at these edges.

FIG. 7*c* shows a similar panel 720 as shown in FIG. 7*b*, though wherein underneath coupling profiles 721, 722 at the panel edges at least one shallow cavity 723 and/or cavity pattern is present in a core 724 of the panel 720. The depth of the peripheral cavities is preferably limited to less than 0.5 mm, more preferably less than 0.3 mm, most preferably 0.1 mm or less. A center portion of the rear side of the core 724 of the panel is provided with cavities 725, here shown as pyramidal cavities, but which can have other shapes, preferably polygonal and/or polyhedral shapes as well. These latter cavities 725 having varying depths across the width and/or length of the panel 720. In a cross-sectional view of the panel 720, as shown in FIG. 7*c*, the apexes of a plurality of aligned cavities 725 define a wave, preferably a sinusoidal wave. This typically improves the sound damping properties of the panel 720. One or more backing layers 726, each of which may be formed by a slab, a film, a woven, a non-woven, and/or a membrane, can be applied to the rear side of the core 724. The backing layer(s) 726 may either cover at least a part of the cavities 723, 725 and/or may be provided with through-holes at least partially aligned with the cavities.

FIG. 8 shows a top view of a part of a production line 801 for producing panels according to the invention, and at least a part of the core 802 a panel produced by said production line. The production line 801 comprises a profiled calendering roller 803 and/or an alternative profiled roller which is axially rotatable and which, in this example, is (optionally) driven by means of one or two chains 804, belts, or alternative conveying elements. The chains 804 co-act with a driven roller 805 and/or with an electromotor (not shown). The profiled roller 803 has a profiled center portion 803*a* provided with hexagonal protrusions 806. The outer portions 803*b* of the profiled roller 803 each comprises a flat surface 803*c* and a slightly profiled (textured) surface 803*d* with protrusions at the very outer end, which outer profiled surface 802*d* is less pronounced than the hexagonal protrusions 806. Optionally, the profiled roller 803 is heated. A core material, which is still in a partially liquid and/or viscous state and/or which is brought into a viscous state, is guided along said profiled roller 803, such that the profile of the profiled roller 803 is pressed into an upper side and/or rear side of the viscous core. This can e.g. be realized by guiding and pressing the core in between the profiled roller 803 and a conveyor belt and/or another roller (not shown). The result of this impressing action is that the core is provided with a honeycomb pattern 807 in a center portion of the core, a shallow texture 808 at two opposing edges, and possibly some traces or scratches 809 caused by the chains 803, which may be considered as additional (micro)pattern. The width of the honeycomb pattern is preferably situated between 10 and 20 cm. The distance between the chains and the hexagonal protrusions 806 is preferably at least 2 mm, and preferably situated in between 2 and 8 mm. The width of the outer texture 803*d* is preferably at least 5 mm, and more preferably situated in between 5 and 15 mm to allow coupling profiles to be milled into the core material (once hardened).

FIG. 9 shows a bottom view of another panel 900 according to the invention. A lower side of a core 901 of the panel is divided into three zones: (i) a centre portion C which comprises an impressed honeycomb pattern with relatively deep hexagonal cavities 902, (ii) a surrounding first peripheral portion P1 which comprises relatively shallow hexagonal cavities 903, wherein the cavity depth optionally gradually decreases towards the panel edges, and (iii) a second peripheral portion P2 which encloses said first peripheral portion P2 and which is free of any cavities. The width W1 of the first peripheral portion P1 may correspond to or may be larger than the width W2 of the second peripheral portion P2.

FIG. 10 shows a bottom view of yet another panel 910 according to the invention. A lower side of a core 911 of the panel is divided into two zones: (i) an oval shaped centre portion C which comprises an impressed grid pattern of relatively deep frustoconical pyramid shaped cavities 912, and (ii) a surrounding peripheral portion P which comprises relatively shallow frustoconical pyramid shaped cavities 913. The peripheral portion P connects to the panel edges.

The depth of the cavities 913 of the peripheral portion may gradually decrease towards the panel edges.

Hence, the above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application. It is, for example, imaginable that the invention of impressing core grooves and/or an alternative 3D pattern in an upper side and/or lower side of a core, in particular by means of calendering, may also be used to create light-weight panels, in particular floor panels, which are not provided with coupling profiles at all or which are provided with only two complementary coupling profiles located at opposite panel edges. In this alternative panel configuration, the decorative structure will typically be affixed, either directly or indirectly, to an upper side of the core. This alternative panel may be used for example as floor panel, wall panel, and/or ceiling panel. Various embodiments of the panel as described above and in the appended claims may be combined with this alternative panel configuration.

By "horizontal" is meant a direction which extends parallel to a plane defined by the floor panel, and which may intersect the core. By "vertical" is meant a direction which is perpendicular to said plane defined by the floor panel. The ordinal numbers used in this document, like "first", "second", and "third" are used only for identification purposes. Hence, the use of the expressions "third locking element" and "second locking element" does therefore not necessarily require the co-presence of a "first locking element".

By "complementary" coupling profiles is meant that these coupling profiles can cooperate with each other. However, to this end, the complementary coupling profiles do not necessarily have to have complementary forms. The "floor panel" according to the invention may also applied as wall covering element, ceiling covering element, or alternative covering element. In case in this document reference is made to a "floor tile" or "floor panel", these expressions may be replaced by expressions like "tile", "wall tile", "ceiling tile", "covering tile".

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel, in particular a floor panel, ceiling panel or wall panel, comprising:
   a calendered, and preferably extruded, core composed of at least one core layer, wherein said core is provided with an upper side and a lower side,
   a decorative top structure, either directly or indirectly, affixed on said upper side of the core,
   a first panel edge preferably comprising a first coupling profile, and a second panel edge preferably comprising a second coupling profile being designed to engage interlockingly with said first coupling profile of an adjacent panel, both in horizontal direction and in vertical direction, wherein the upper side and/or the lower side of at least one core layer and/or the core is provided with at least one impressed pattern which comprises one or more impressed core grooves, realised by means of extrusion and/or calendering, wherein a centre portion of said impressed pattern comprises impressed core grooves having a depth which exceeds a depth of impressed core grooves of at least one peripheral portion of the impressed pattern.

2. The panel according to claim 1, wherein the core comprises a centre portion and a peripheral portion enclosing said centre portion, wherein the panel edges and coupling profiles make part of said peripheral portion of the core, wherein the peripheral portion of the core encloses said at least one peripheral portion of the impressed pattern, and wherein said peripheral portion of the core is free of core grooves.

3. The panel according to foregoing claim 1, wherein at least one, preferably each, core groove comprises at least one circumferential edge enclosing a groove bottom, wherein groove bottom has the shape of a pyramid, in particular a square pyramid or a hexagonal pyramid.

4. The panel according to claim 1, wherein each core groove comprises at least one circumferential edge enclosing a groove bottom, wherein the circumferential edge is tapered towards the groove bottom.

5. The panel according to claim 1, wherein said at least one peripheral portion of the impressed pattern defines a circumferential peripheral portion of the impressed pattern enclosing the centre portion of the impressed pattern.

6. The panel according to claim 1, wherein at least two opposing edges of each core groove are at least partially convexedly curved or concavedly curved, wherein the core grooves are elongated, and wherein at least two opposing longitudinal edges of each groove are at least partially, convexedly curved or concavedly carved.

7. The panel according to claim 1, wherein each core groove comprises at least one circumferential edge enclosing a groove bottom, wherein at least a part of the at least one circumferential edge is formed by stretched material, and wherein the at least a part of the groove bottom is formed by compressed material.

8. The panel according to claim 1, wherein that the lower side and/or upper side of the core has substantially the same surface texture as at least a part of each core groove, and preferably wherein that the lower side and/or upper side of the core and the core grooves have substantially the same surface texture.

9. The panel according to claim 1, wherein at least one, preferably each, core groove comprises at least one circumferential edge enclosing a groove bottom, wherein the core groove depth (GD), as defined by the surface of the groove bottom, of at least one core groove varies along the core groove length.

10. The panel according to claim 1, wherein each core groove comprises at least one circumferential edge enclosing a groove bottom, wherein the groove bottom of at least one core groove is profiled, wherein more preferably the groove bottom is provided with a patterned profiled surface, in particular a spike patterned profiled surface.

11. The panel according to claim 10, wherein the spike patterned profile surface is at least partially formed by a pattern of frustoconically shaped spikes.

12. Panel The panel according to claim 1, wherein the core groove depth (GD) of at least one core groove is smaller than 0.3 times a panel thickness (T), more preferably wherein the core groove depth (GD) of at least one core groove is smaller than 0.2 times the panel thickness.

13. The panel according to claim 1, wherein at least one groove, and preferably each groove, extends to and connects different edges, in particular to opposing edges, of the panel.

14. The panel according to claim 1, wherein the decorative top structure comprises at least one decorative layer and at least one transparent wear layer covering said decorative layer wherein the decorative top structure comprises at least one back layer situated in tween said decorative layer and the core, wherein said back layer is preferably made of a vinyl compound.

15. The panel according to claim 1, wherein the core is extended along an extrusion direction, and wherein the grooves extend in said extrusion direction.

16. A decorative covering, in particular a decorative floor covering, decorative ceiling covering, or decorative wall covering, comprising a plurality of mutually coupled decorative panels according to claim 1.

17. A core for use in a panel according to claim 1.

18. A system for producing a decorative panel, in particular a decorative panel according to claim 1, comprising:

at least one extruder for extruding a liquified polymer based core composition to form a soft core sheet, and at least two facing calendering rolls positioned downstream of said extruded core, wherein at least one, preferably only one, calendering roll is provided with a profiled outer surface configured to abut a side of the soft core sheet provided and/or to be provided with core grooves.

19. The system according to claim 18, wherein the extruder is configured to provide an upper side and/or a lower side of the core sheet with core grooves, and wherein the at least one profiled calendering roll is configured to preserve and/or deform said core grooves.

20. A method of producing a decorative panel, in particular a decorative panel according to claim 1, comprising the steps of:

A) liquifying a polymer based core composition;

B) extruding said liquified polymer based core composition to form a soft core sheet;

C) guiding said soft sheet in between at least two facing calendering rolls, (i) wherein during extrusion according to step B) at least one pattern, in particular a plurality of core grooves, is formed at an upper side and/or lower side of said core sheet, which pattern is substantially preserved when the guiding core sheet in between the calendering rolls; and/or (ii) wherein at least one calendering roll is profiled to impress at least one pattern, in particular a plurality of core grooves, into an upper side and/or lower side of said core sheet, D) allowing the core sheet provided with the core grooves to solidify;

E) applying a decorative top structure, either directly or indirectly, onto the upper side of the core sheet, such that a decorative plate is formed; and F) cutting or sawing the decorative plate into a plurality of decorative panels, and G) machining the panel edges of each decorative panel, such that a first panel edge is provided with a first coupling profile, and a second panel edge is provided with a second coupling profile being designed to engage interlockingly with said first coupling profile of an adjacent panel, preferably both in horizontal direction and in vertical direction, and preferably such that a third panel edge is provided with a third coupling profile, and a fourth panel edge comprising a fourth 5 coupling profile being designed to engage interlockingly with said third coupling profile of an adjacent panel, preferably both in horizontal direction and in vertical direction.

21. The method according to claim 20, wherein during 10 step D) the extruded core is actively cooled down, preferably by means of cooling water.

\* \* \* \* \*